US012810817B2

(12) United States Patent
Lee et al.

(10) Patent No.: US 12,810,817 B2
(45) Date of Patent: Nov. 24, 2026

(54) DISPLAY DEVICE

(71) Applicant: LG Display Co., Ltd., Seoul (KR)

(72) Inventors: Yongwon Lee, Paju-si (KR); Seoyeon Park, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 19/241,150

(22) Filed: Jun. 17, 2025

(65) Prior Publication Data

US 2026/0024503 A1 Jan. 22, 2026

(30) Foreign Application Priority Data

Jul. 17, 2024 (KR) ........................ 10-2024-0094179

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2300/043* (2013.01); *G09G 2300/0819* (2013.01); *G09G 2310/08* (2013.01); *G09G 2320/0233* (2013.01); *G09G 2320/0247* (2013.01)

(58) Field of Classification Search
CPC ......... G09G 3/3266; G09G 2300/0426; G09G 3/32; G09G 3/3233; G09G 3/3275
See application file for complete search history.

(56) References Cited

U.S. PATENT DOCUMENTS

| | | | | |
|---|---|---|---|---|
| 12,148,377 | B2 * | 11/2024 | Her | G09G 3/3233 |
| 2014/0022289 | A1 * | 1/2014 | Lee | G09G 3/006 345/76 |
| 2018/0350286 | A1 * | 12/2018 | Lee | G09G 3/3233 |
| 2019/0130846 | A1 * | 5/2019 | Chung | G09G 3/3233 |
| 2023/0389380 | A1 * | 11/2023 | Shin | H10D 86/423 |
| 2024/0029651 | A1 * | 1/2024 | Kim | G09G 3/3291 |
| 2024/0265850 | A1 * | 8/2024 | Heo | G09G 3/32 |
| 2024/0290250 | A1 * | 8/2024 | Lee | G09G 3/3233 |
| 2025/0118268 | A1 * | 4/2025 | Sang | G09G 3/3291 |
| 2025/0273148 | A1 * | 8/2025 | Kim | G09G 3/3233 |
| 2025/0308430 | A1 * | 10/2025 | Park | G09G 3/2092 |

FOREIGN PATENT DOCUMENTS

| | | |
|---|---|---|
| KR | 10-2023-0050024 A | 4/2023 |
| KR | 10-2023-0142020 A | 10/2023 |

* cited by examiner

*Primary Examiner* — Van N Chow
(74) *Attorney, Agent, or Firm* — Birch, Stewart, Kolasch & Birch, LLP

(57) ABSTRACT

A display device can include a display panel on which a plurality of data lines, a plurality of gate lines, a plurality of power lines, and a plurality of pixels are disposed on a substrate, a data driver configured to output a data voltage of pixel data to one of the data lines, and a gate driver configured to supply a gate signal to one of the gate lines sequentially. The pixel can include a light emitting element having a first electrode, a second electrode facing the first electrode, and a light emitting layer disposed between the first electrode and the second electrode, a driving element configured to control the light emitting element, and a plurality of switching elements configured to control the driving element. The driving element can include an oxide semiconductor layer.

19 Claims, 16 Drawing Sheets

DISPLAY DEVICE

CROSS-REFERENCE TO RELATED APPLICATION

The present application claims priority to Korea Patent Application No. 10-2024-0094179, filed in the Republic of Korea on Jul. 17, 2024, the entire contents of which are hereby expressly incorporated by reference into the present application.

BACKGROUND

Field

The present disclosure relates to an apparatus and particularly to, for example, without limitation, a display device which improves a flicker performance and reliability of a display panel.

Discussion of the Related Art

An electroluminescent display is classified into an inorganic electroluminescent display and an organic electroluminescent display depending on a material of an emission layer. An active matrix organic light emitting diode (OLED) display includes organic light emitting diodes (OLEDs) capable of emitting light by themselves and has many advantages of fast response time, high emission efficiency, high luminance, wide viewing angle, and the like. In the organic electroluminescent display, an OLED is formed in each of the pixels. The organic electroluminescent display device has not only the fast response time, high emission efficiency, high luminance, a wide viewing angle, and the like, but also an excellent contrast ratio and color reproductivity because the black scale can be expressed in a full black color.

The pixels of the organic electroluminescent display device include a driving element for driving the OLED, and a pixel circuit which includes a capacitor connected to the driving element.

The description provided in the discussion of the related art section should not be assumed to be prior art merely because it is mentioned in or associated with that section. The discussion of the related art section can include information that describes one or more aspects of the subject technology, and the description in this section does not limit the invention.

SUMMARY OF THE DISCLOSURE

The inventors of the present disclosure have recognized that there can be a difference in the electric characteristic of the driving element among pixels because of a process deviation and a device characteristic deviation which can be caused during a manufacturing process. Such a difference can increase even more as the driving time passes by. In order to compensate for a difference in the electric characteristic of the driving element among pixels, an internal compensation circuit can be added to the pixel circuit. The internal compensation circuit can sample a threshold voltage of the driving element, and compensate for a gate voltage of the driving element by as much as the threshold voltage of the driving element. However, when the pixels driven by the internal compensation circuit are operated at low luminance, non-uniform luminance can be caused inside a screen of a display panel.

An object of the present disclosure is to compensate for a threshold voltage of the driving element in real-time using the internal compensation circuit, and to improve a uniformity of the luminance of the screen.

One or more embodiments of the present disclosure provide a display device, including: a display panel on which a plurality of data lines, a plurality of gate lines, a plurality of power lines, and a plurality of pixels are disposed on a substrate; a data driver configured to output a data voltage of pixel data to one of the data lines; and a gate driver configured to supply a gate signal to one of the gate lines sequentially. The pixel can include a light emitting element having a first electrode, a second electrode facing the first electrode, and a light emitting layer disposed between the first electrode and the second electrode; a driving element configured to control the light emitting element; and a plurality of switching elements configured to control the driving element. The driving element can include an oxide semiconductor layer.

The technical problems and limitations to be addressed by the present disclosure are not limited to the above-mentioned technical problems and limitations, and other technical problems and limitations that are not mentioned will be clearly understood by ordinary-skilled persons in the art to which the present disclosure pertains from the following description.

A display device according to an embodiment of the present disclosure can accurately compensate for a threshold voltage of the driving element when operating the pixels of the display panel at a fast velocity and improve the luminance uniformity in the entire screen, because a sensing step of sensing a threshold voltage of the driving element and a writing step of the pixel data to write the pixel data into the pixels are divided in terms of the time so that a threshold voltage sensing time can be sufficiently secured, and can prevent an error component charged at a major node of the pixel circuit by separating a capacitor in which a threshold voltage of the driving element is stored and a capacitor in which a data voltage is stored.

In addition, by setting an anode reset voltage separate from the reference voltage, it is possible to minimize or reduce a luminance difference among pixels when a driving frequency of the pixels is changed as a refresh rate is varied, and to improve a flicker phenomenon when a variable driving frequency is applied while using a fewer number of gate lines, thereby improving the image quality.

The effects of the present disclosure are not limited to the above-described effects and other effects which are not described herein can be derived by those skilled in the art from the following description of the embodiments of the present disclosure.

It is to be understood that both the foregoing general description and the following detailed description are example and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

Figure 1:
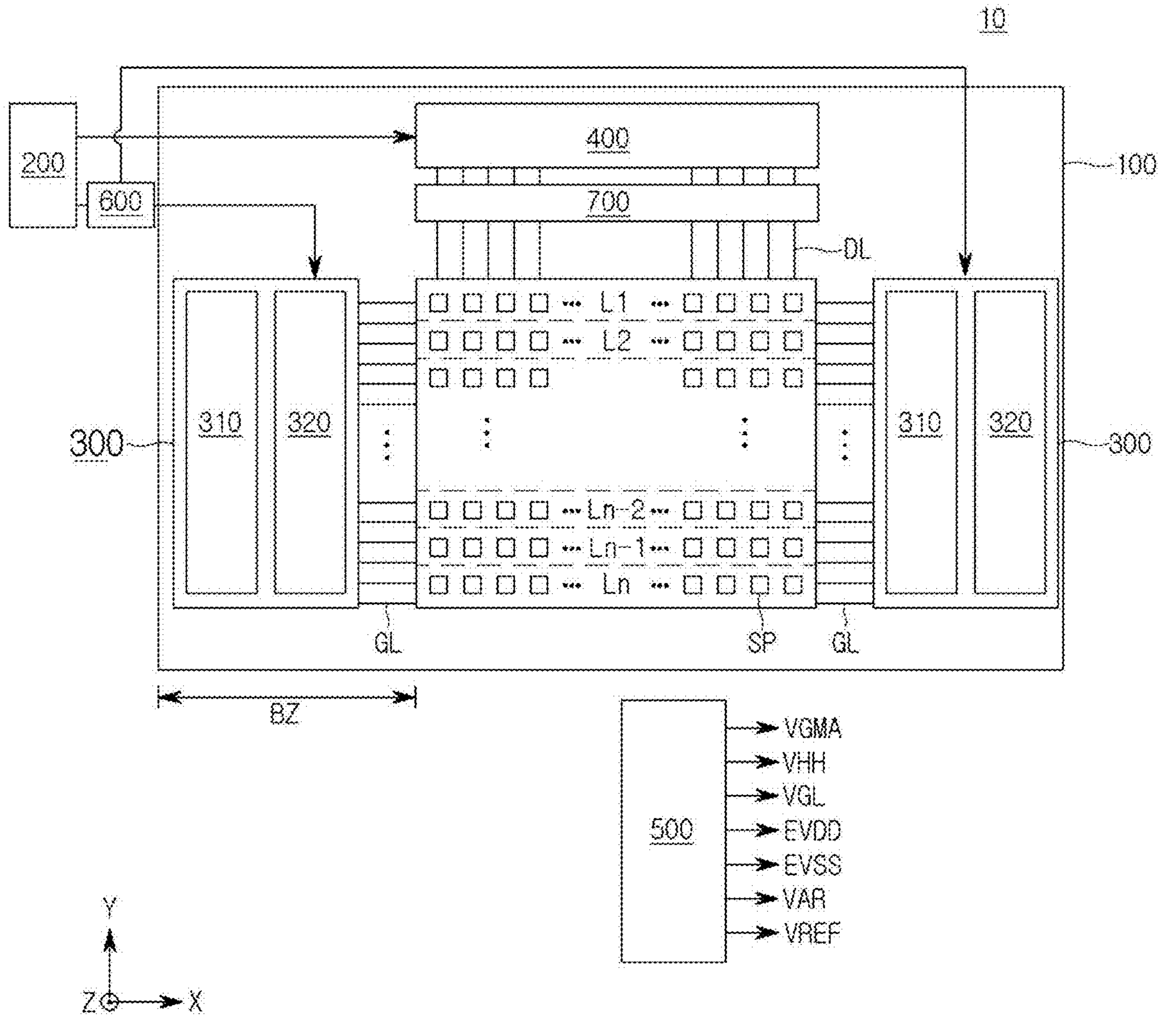
FIG. 1 is a block diagram schematically illustrating a display device according to one or more embodiments of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

The merits and characteristics of the present disclosure and a method for achieving the merits and characteristics will become more apparent from the embodiments described in detail in conjunction with the accompanying drawings. However, the present disclosure is not limited to the disclosed embodiments, but can be implemented in various different ways. These embodiments are provided so that this disclosure will be thorough and complete, and will fully convey the scope of the present disclosure to those skilled in the art. The present disclosure will be defined only by the scope of the appended claims. Like reference numerals generally denote like elements throughout the specification.

It will be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present. As used herein, the term "and/or" includes any and all combinations of one or more of the associated listed items.

The terms used in the present specification are merely used to describe specific embodiments and are not intended to limit the present disclosure. A singular expression includes a plural expression unless a description to the contrary is specifically pointed out in context. The terms "comprises" and/or "comprising," when used herein, specify the presence of stated elements, steps, operations, and/or components, but do not preclude the presence or addition of one or more other elements, steps, operations, and/or components.

Although the terms including an ordinal number such as first, second, etc. can be used for describing various elements, the structural elements are not restricted by the terms. The terms are only used to distinguish one element from another element.

Therefore, a first component to be mentioned below can be a second component in a technical concept of the present disclosure. Unless otherwise defined, all terms including technical and scientific terms used herein have the same meaning as commonly understood by one of ordinary skill in the art to which this disclosure belongs. It will be further understood that terms, such as those defined in commonly used dictionaries, will not be interpreted in an idealized or overly formal sense unless expressly so defined herein.

In the following description, when a detailed description of well-known functions or configurations related to this document is determined to unnecessarily cloud a gist of the inventive concept, the detailed description thereof will be omitted or can be briefly discussed.

Throughout the drawings and the detailed description, unless otherwise described, the same drawing reference numerals should be understood to refer to the same elements, features, and structures. The relative size and depiction of these elements can be exaggerated for clarity, illustration, and convenience. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations are selected only for convenience of writing the specification and can be thus different from those used in actual products.

Any implementation described herein as an "example" is not necessarily to be construed as preferred or advantageous over other implementations.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can" and vice versa.

In the description of the various embodiments of the present disclosure, where positional relationships are described, for example, when a position relation between two parts is described as, for example, "on," "over," "under," and "next," or the like, one or more other parts can be located between the two parts unless a more limiting term, such as "just" or "direct (ly)" is used. For example, where an element or layer is disposed "on" another element or layer, a third layer or element can be interposed therebetween.

In describing a temporal relationship, when the temporal order is described as, for example, "after," "subsequent," "next," and "before," a case that is not continuous can be included unless a more limiting term, such as "just," "immediate (ly)," or "direct (ly)" is used.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, or the third element.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" can apply, for example, to a separate circuit or structure, an integrated circuit, a computational block of a circuit device, or any structure configured to perform a described function as should be understood to one of ordinary skill in the art.

Rather, these embodiments can be provided so that this disclosure can be sufficiently thorough and complete to assist those skilled in the art to fully understand the scope of the present disclosure. All the components of each display device according to all embodiments of the present disclosure are operatively coupled and configured.

FIG. 1 is a block diagram schematically illustrating a display device according to one or more embodiments of the present disclosure.

Referring to FIG. 1, a display device 10 includes a display panel including a plurality of pixels SP, a controller 200, a gate driver 300 configured to supply a gate signal to each of the plurality of pixels SP, a data driver 400 configured to supply a data signal to each of the plurality of pixels SP, and a power supply unit 500 configured to supply power required for driving to each of the plurality of pixels SP.

The display panel 100 can be a rectangular shaped panel having a length in an X axis direction, a width in a Y axis direction, and a thickness in a Z axis direction. The display panel 100 can include a display region AA (or active area) (see FIG. 2) in which the pixels SP are disposed, and a non-display region NA (or non-active area) (see FIG. 2) disposed to surround the display region AA and in which the gate driver 300 and the data driver 400 are disposed. The non-display region NA can surround the display region AA entirely or in part(s).

In the display panel 100, a plurality of gate lines GL and a plurality of data lines DL intersect each other, and each of the plurality of pixels SP is connected to the gate line GL and the data line DL. In more detail, one pixel SP receives a gate signal from the gate driver 300 through the gate line GL, receives a data signal from the data driver 400 through the data line DL, and receives a high potential driving voltage EVDD and a low potential driving voltage EVSS from the power supply unit 500 through a driving power line. The display panel 100 can further include power lines connected in common to the pixels. The power lines are connected to constant voltage nodes of the pixel circuits and supply a constant voltage required for driving of the plurality of pixels SP to the plurality of pixels SP.

Here, the gate line GL supplies a gate signal including a scan signal SC (FIG. 5) and a light emission control signal EM (FIG. 5), and the data line DL supplies a data voltage Vdata. In addition, according to various embodiments, the gate line GL can include a plurality of scan lines SCL configured to supply the scan signal SC and a light emission control line EML configured to supply a light emission control signal EM. Further, the plurality of pixels SP further includes a power line VL to receive an anode reset voltage Var, a reference voltage Vref, and the like.

Figure 2:
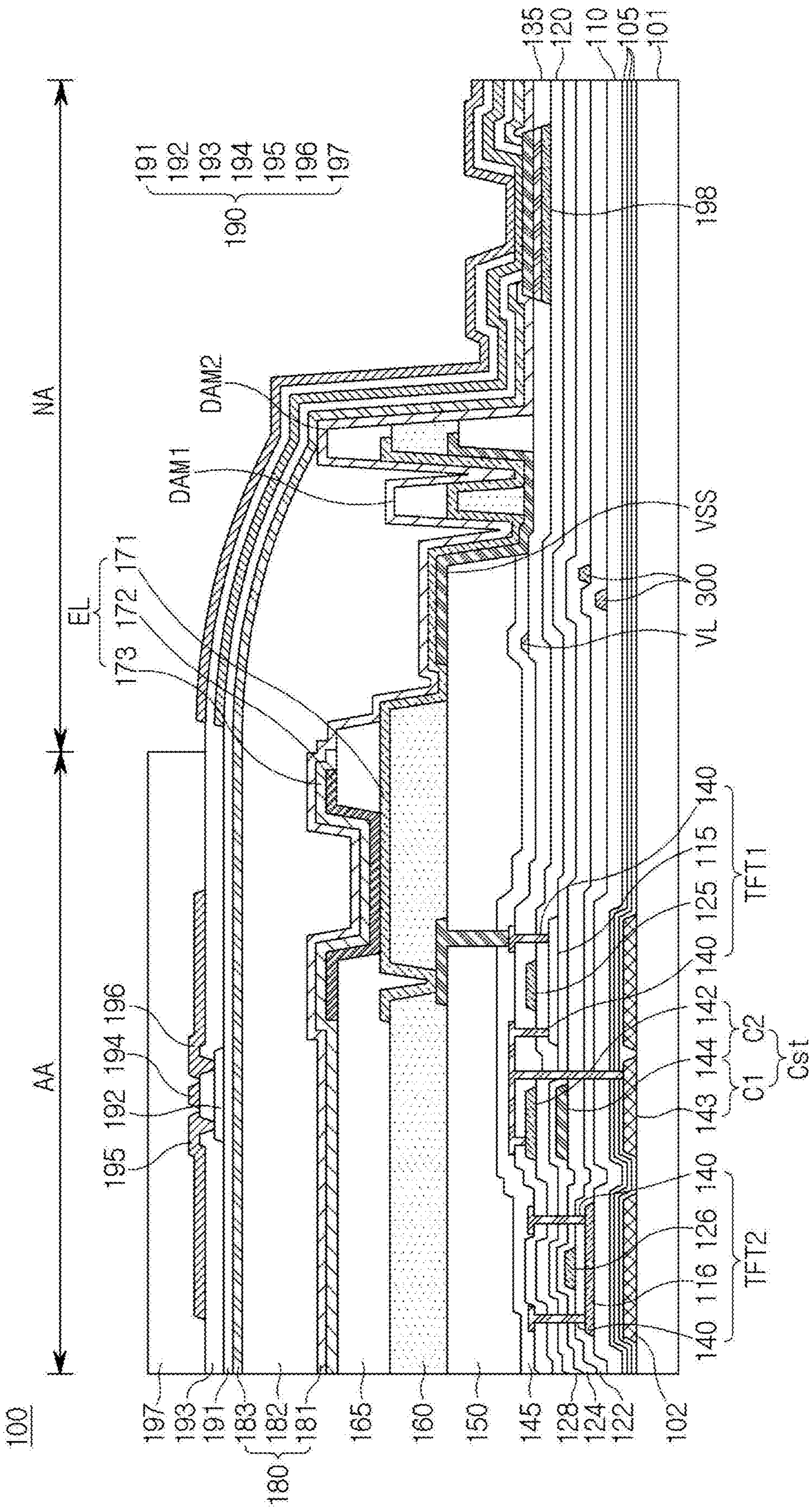
FIG. 2 is a cross-sectional view illustrating a lamination shape of a display device according to an embodiment of the present disclosure.

Further, each of the pixels SP, as illustrated in FIG. 2, includes a light emitting element EL and a pixel circuit configured to control driving of the light emitting element EL. At this instance, the light emitting element EL consists of an anode electrode 171, a cathode electrode 173, and a light emitting layer 172 between the anode electrode 171 and the cathode electrode 173. Each of the pixels SP includes a pixel circuit.

The pixel circuit includes a plurality of switching elements, a driving element, and a capacitor. Here, the switching element and the driving element can be formed as thin film transistors. In the pixel circuit, the driving element regulates a light emission amount of the light emitting element EL by controlling a current amount supplied to the light emitting element EL according to a data voltage. In addition, the plurality of switching elements receives a scan signal SC supplied through a plurality of scan lines SCL, and a light emission control signal EM supplied through the light emission control line EML and drives the pixel circuit.

The display panel 100 can be implemented as a transmissive or a non-transmissive display panel. The transmissive display panel can be applied to a transparent display device of which an image is displayed in the screen and a real background object is visible. The display panel 100 can be manufactured as a flexible display panel. The flexible display panel can be implemented as an OLED panel which uses a plastic substrate.

Each of the plurality of pixels SP can be divided into red sub-pixels, green sub-pixels, and blue sub-pixels for color implementation. Each of the pixels can further include a white sub-pixel. Each of the sub-pixels can be implemented as one among the pixel circuits described above. Each of the pixel circuits is connected to a data line, gate lines and power lines.

The pixels can be disposed as a real color pixel, and a pentile pixel. The pentile pixel can implement a higher resolution than a resolution of the real color pixel by driving two sub-pixels, each of which having a different color, as one pixel SP using a predetermined pixel rendering algorithm. The pixel rendering algorithm can compensate for a color expression lacked in each pixel with a color of light emitted from a neighboring pixel.

Touch sensors can be disposed on the display panel 100. A touch input can be sensed using additional touch sensors or can be sensed through pixels SP. The touch sensors can be disposed on the screen of the display panel in an on-cell type or an add-on type, or can be implemented as in-cell type touch sensors embedded to the display panel 100.

The controller 200 processes image data RGB input from an external device to be suitable for a size and a resolution of the display panel 100, and supplies the processed data to the data driver 400. The controller 200 generates a gate control signal GCS and a data control signal DCS using synchronization signals input from the external device such as a dot clock signal CLK, a data enable signal DE, a horizontal synchronization signal Hsync, and a vertical synchronization signal Vsync. By supplying the generated gate control signal GCS and the data control signal DCS to each of the gate driver 300 and the data driver 400, the controller 200 controls the gate driver 300 and the data driver 400.

The controller 200 can be combined with various processors, for example, a micro-processor, a mobile processor, an application processor, and the like according to a device mounted therein.

A host system can be one among a television system, a set-top box, a navigation system, a personal computer, a home theater system, a mobile device, a wearable device, a vehicle system, and the like.

The controller 200 can control an operation timing of a display panel driver with a frame frequency (Hz) obtained by multiplying i (i is an integer greater than 0) to an input frame frequency. The input frame frequency is 60 Hz in an NTSC (National Television Standards Committee) method, and 50 Hz in PAL (Phase-Alternating Line) method.

The controller 200 generates a signal so that the pixel SP can be driven at various refresh rates. For example, the controller 200 generates signals related to driving so that the pixel SP can be driven in a Variable Refresh Rate (VRR) mode or to be able to switch between a first refresh rate and a second refresh rate. For example, the controller 200 can drive the pixel SP at various refresh rates by simply changing a speed of a clock signal, generating a synchronous signal such that a horizontal blank or a vertical blank is generated, or driving the gate driver 300 in a mask manner.

The controller 200 generates a gate control signal GCS for controlling an operation timing of the gate driver 300, and a data control signal DSC for controlling an operation timing of the data driver 400 based on a timing signal (Vsync, Hsync, and DE) received from the host system. The controller 200 synchronizes the gate driver 300 and the data driver 400 with each other by controlling an operation timing of the display panel driver.

A voltage level of the gate control signal GCS output from the controller 200 is converted into a gate low voltage VGL and VEL and a gate high voltage VGH and VEH through the level shifter 600, and can be supplied to the gate driver 300 through the driving power line. The level shifter 600 converts a low level voltage of the gate control signal GCS into a gate low voltage VGL, and a high level voltage of the gate control signal GCS into a gate high voltage VGH. The gate control signal GCS includes a start pulse and a shift clock.

The gate driver 300 sequentially outputs the gate signal to the plurality of gate lines GL under the control of the controller 200. The gate driver 300 shifts the gate signal using the shift register, thereby sequentially supplying the signals to the gate lines GL. The gate driver 300 can be disposed on one side or both sides of the display panel 100 in a GIP (Gate-In-Panel) manner.

The gate signal can include a scan signal SC and a light emission control signal EM in the organic electroluminescent display device. The scan signal SC includes a scan pulse which swings between a gate on voltage VGL and a gate off voltage VGH. The light emission control signal EM can include a light emission control signal pulse which swings between a gate on voltage VEL and a gate off voltage VEH.

The scan pulse is synchronized with the data voltage Vdata, and selects pixels SP of a line into which data will be written. The light emission control signal EM defines a light emission time of the pixels SP.

The gate driver 300 can include a light emission control driver 310 and at least one or more scan drivers 320.

The light emission control driver 310 outputs the light emission control signal pulse in response to a start pulse and a shift clock from the controller 200, and sequentially shifts the light emission control signal pulse according to the shift clock.

At least one or more scan drivers 320 output a scan pulse in response to a start pulse and a shift clock from the controller 200, and shifts a scan pulse on a shift clock timing.

The data driver 400 outputs a data voltage by receiving pixel data of an input image received as a digital signal from the controller 200. The data driver 400 converts pixel data of an input image into a gamma compensation voltage in every frame period in a normal driving mode by using a digital-to-analog converter DAC, and outputs a data voltage Vdata. In a low speed driving mode, in a refresh frame only, the data driver 400 converts pixel data of the input image using the DAC, outputs a data voltage Vdata, and does not output a data voltage Vdata by stopping driving in a hold frame. In a low speed driving mode, the plurality of pixels SP charges a pixel data voltage in the refresh frame, and maintains a previous data voltage in the hold frame.

In FIG. 1, the data driver 400 is disposed as one shape on one side of the display panel 100, however, a quantity and an arrangement position of the data driver 400 is not limited thereto.

For example, the data driver 400 is configured with a plurality of integrated circuits (IC), and can be disposed in a plurality of divided positions on one side of the display panel 100. The data driver 400 can further include a demultiplexer array 700 disposed between the data lines DL.

The demultiplexer array 700 sequentially supplies a data voltage out from channels of the data driver 400 to the data lines DL by using a plurality of demultiplexers DEMUX. The demultiplexer can include a plurality of switching elements disposed on the display panel 100. When the demultiplexer is disposed between the output terminals of the data driver 400 and the data lines DL, a quantity of channels of the data driver 400 can decrease. The demultiplexer array can be omitted.

The power supply unit 500 generates a direct current DC power required for driving the pixel array and the display panel driver by using a DC-DC converter. The DC-DC converter can include a charge pump, a regulator, a buck converter, a boost converter, and the like. The power supply unit 500 can generate a driving voltage of the direct current such as a gate on voltage VGL and VEL, a gate off voltage VGH and VEH, a high potential driving voltage EVDD, a low potential driving voltage EVSS and the like, by receiving a direct current input voltage applied from the host system. The gate on voltage VGL and VEL, and the gate off voltage VGH and VEH are supplied to the level shifter 600 and the gate driver 300. Voltages such as the high potential driving voltage EVDD, the low potential driving voltage EVSS, a reference voltage VREF, an anode reset voltage Var, and the like are commonly supplied to the pixels SP.

The display device 10 can further include a touch sensor driver for driving the touch sensors. The touch sensor driver is omitted in FIG. 1. The data driver 400 and the touch sensor driver can be integrated in one drive IC (integrated circuit). In a mobile device, or a wearable device, the controller 200, the power supply unit 500, the data driver 400 and the like can be integrated in one drive IC.

FIG. 2 is a cross-sectional view illustrating a lamination shape of a display device according to an embodiment of the present disclosure.

Referring to FIG. 2, the display panel 100 includes the display region AA on which the pixel SP is disposed, and the non-display region NA surrounding the display region AA and on which the gate driver 300 and the data driver 400 are disposed.

The display panel 100 according to an embodiment of the present disclosure includes a substrate 101, thin film transistors TFT1 and TFT2, a bank layer 165, a light emitting element EL, an encapsulation layer 180, a touch layer 190, a touch protection layer 197, a dam DAM and a pad part 198.

The thin film transistor TFT1 and TFT2 can be disposed on the substrate 101. The thin film transistor TFT1 and TFT2 drives the light emitting element EL in the display region AA.

The substrate 101 supports various components of the display panel 100. The substrate 101 can be formed on a transparent insulation material such as glass, plastic, and the like. When the substrate 101 is formed of plastic, the substrate 101 can be referred to as a plastic film or a plastic substrate. For example, the substrate 101 can be in a film form which includes one among polyimide polymer, polyester polymer, silicon polymer, acrylic polymer, polyolefin polymer, and a copolymer thereof, but the embodiments of the present disclosure are not limited thereto. Further, when the substrate 101 is made of plastic, the substrate 101 can be formed in a dual structure. For example, the substrate 101 can have a dual structure having an adhesive layer interposed between a first polyimide layer and a second polyimide layer.

When the substrate 101 is made of glass, the substrate 101 can be referred to as a glass substrate. For example, the glass substrate can include a shieling metal 102 below the thin film transistor TFT1 and TFT2, and can serve to protect the device from external light or signal interference.

The thin film transistor TFT2 can include a semiconductor layer 116, a gate electrode 126, and a source and drain electrode 140. The thin film transistor TFT1 can be a driving element or at least one switching element. The semiconductor layer 116 can be configured with poly-silicon p-Si, and in this case, a predetermined region can be doped with impurities. In addition, the semiconductor layer 116 can be configured with amorphous silicon a-Si, or various organic semiconductor materials such as pentacene. The semiconductor layer 116 can be configured with oxide. When it comes to a material configuring the semiconductor layer 116, the embodiments of the present disclosure are not limited thereto. The semiconductor layer 116 can be an active layer, and is not limited to terms.

The gate electrode 126 can be disposed on the semiconductor layer 116. The gate electrode 126 can be formed of various conductive materials, for example, magnesium (Mg), aluminum (Al), nickel (Ni), chrome (Cr), molybdenum (Mo), tungsten (W), gold (Au), or an alloy thereof, but embodiments of the present disclosure are not limited thereto.

A gate insulation layer 122 can be disposed between the semiconductor layer 116 and the gate electrode 126. The gate insulation layer 122 can be a layer for insulating the semiconductor layer 116 and the gate electrode 126 from each other, and can be formed of an insulating material. For example, the gate insulation layer 122 can be configured as a single-structured layer or a multi-structured layer of silicon oxide SiOx, or silicon nitride SiNx, but is not limited thereto.

The source and drain electrode 140 can be electrically connected to the semiconductor layer 116, can be spaced apart from the semiconductor layer 116, and can be configured with copper Cu, aluminum Al, molybdenum Mo, titanium Ti, or an alloy thereof, but is not limited thereto.

Between the semiconductor layer 116 and the substrate 101, a buffer layer 105, a shielding metal 102, and a first insulation layer 110 can be disposed. The buffer layer 105 can delay dispersion of moisture and/or oxygen permeating the substrate 101. The first insulation layer 110 can protect a semiconductor layer 115, and can block various kinds of defects introduced from the substrate 101. The shielding metal 102 can be disposed between the buffer layer 105 and the first insulation layer 110 so that the shielding metal 102 can protect the thin film transistors TFT1 and TFT2 from external light or signal interference.

An uppermost layer of the buffer layer 105 contacting the first insulation layer 110 can be formed of a material having a different etch characteristic from that of the remaining layers of the buffer layer 105, such as the first insulation layer 110, a second insulation layer 120, and a third insulation layer 135. The uppermost layer of the buffer layer 105 contacting the first insulation layer 110 can be formed of one among silicon nitride SiNx and silicon oxide SiOx. The remaining layers of the buffer layer 105, such as the first insulation layer 110, the second insulation layer 120, and the third insulation layer 135 can be formed of the other one among silicon nitride SiNx and silicon oxide SiOx. For example, the uppermost layer of the buffer layer 105 contacting the first insulation layer 110 can be formed of silicon nitride SiNx, and the remaining layers of the buffer layer 105, such as the first insulation layer 110, the second insulation layer 120, and the third insulation layer 135 can be formed of silicon oxide SiOx, but are not limited thereto.

The other thin film transistor TFT1 can be disposed on the substrate 101. The thin film transistor TFT1 can include the semiconductor layer 115, a gate electrode 125, and the source and drain electrode 140. The thin film transistor TFT1 can be a driving element or at least one switching element. A second insulation layer 120 (a gate insulation layer) can be disposed between the semiconductor layer 115 and the gate electrode 125.

An inter-layer insulation layer 128 can be disposed between the thin film transistor TFT1 and the other thin film transistor TFT2.

For convenience of description, only two thin film transistors TFT among various thin film transistors are illustrated, however, another thin film transistor TFT can be included into the display panel 100. In addition, in the present disclosure, it is described that the thin film transistor has a coplanar structure, however, can be implemented to have a different structure such as a staggered structure and the like, and is not limited thereto.

The thin film transistor TFT2 can include the semiconductor layer 115 disposed on the inter-layer insulation layer 128, the gate electrode 125 overlapping the semiconductor layer 115 with the second insulation layer 120 interposed therebetween, and the source and drain electrode 140 formed on the third insulation layer 135 to be in contact with the semiconductor layer 115.

The semiconductor layer 115 can be a region in which a channel is formed when the thin film transistor TFT2 is driven. The semiconductor layer 115 can be formed as an oxide semiconductor, and can be formed as various organic semiconductors such as amorphous silicon a-Si, polycrystalline silicon poly-Si, or pentacene, but is not limited thereto. The semiconductor layer 115 can be formed on the inter-layer insulation layer 128. The semiconductor layer 115 can have a channel region, a source region, and a drain region. The channel region can be formed such that the channel region is overlapped with the gate electrode 125, with the second insulation layer 120 interposed therebetween to form the channel region between the second insulation layer 120 and the source and drain region. The source region can be electrically connected to the source electrode 140 through the contact hole penetrating the second insulation layer 120 and the third insulation layer 135. The drain region can be electrically connected to the drain electrode 140 through a contact hole penetrating the second insulation layer 120 and the third insulation layer 135.

The gate electrode 125 can be formed on the second insulation layer 120, and can be overlapped with the channel region of the semiconductor layer 115, with the second insulation layer 120 interposed therebetween. The gate electrode 125 can be formed of a first conductive material which is a single-structured layer or a multi-structured layer formed of one among magnesium (Mg), molybdenum (Mo), aluminum (Al), chrome (Cr), gold (Au), titanium (Ti), nickel (Ni), neodymium (Nd), and copper (Cu), or an alloy thereof, but is not limited thereto.

The source electrode 140 can be in contact with the source region of the semiconductor layer 115 exposed through the contact hole penetrating the second insulation layer 120 and the third insulation layer 135. The drain electrode 140 can face the source electrode 140, and can be in contact with the drain region of the semiconductor layer 115 exposed through the contact hole penetrating the second insulation layer 120 and the third insulation layer 135. The source and drain electrode 140 can be formed of a second conductive material which is a single-structured layer or a multi-structured layer formed of one among molybdenum (Mo), aluminum (Al), chrome (Cr), gold (Au), titanium (Ti), nickel (Ni), neodymium (Nd), and copper (Cu), or an alloy of two or more of the above, but is not limited thereto.

At least one among the thin film transistors TFT1 and TFT2 can be a driving element. The driving element can regulate an emission amount of the light emitting element EL by receiving the high potential driving voltage EVDD and controlling a current supplied to the light emitting element EL in response to the data voltage Vdata supplied to the gate electrode 125 and 126, and can make the light emitting element EL continue the light emission by supplying a constant current until a data voltage Vdata of the next frame is supplied by a voltage charged in a storage capacitor Cst. A line to which the high potential driving voltage EVDD is supplied can be formed parallel to the data line DL.

The storage capacitor Cst can be disposed on the substrate 101. The storage capacitor Cst can include a first electrode 143, a second electrode 144, and a third electrode 142.

At least one insulation layer can be disposed between the first electrode 143 and the second electrode 144, and at least one insulation layer can be disposed between the second electrode 144 and the third electrode 142. At least one among the first electrode 143, the second electrode 144, and the third electrode 142 can be connected to the source electrode 140 or the drain electrode 140 of the thin film transistor TFT.

The storage capacitor Cst can include a first capacitor C1 and a second capacitor C2.

The first capacitor C1 consists of the first electrode 143 disposed on the same layer as the shielding metal 102 and the second electrode 144, and the second capacitor C2 can consist of the second electrode 144 and the third electrode 142 disposed on the same layer as the gate electrode 125 of the thin film transistor TFT2.

The connection electrode 155 can be disposed between the first intermediate layer 150 and a second intermediate layer 160. The connection electrode 155 can be connected to the drain electrode 140 by being exposed through a contact hole penetrating the first insulation layer 150. The connection electrode 155 can be formed of a material having a low resistivity similar to or like the drain electrode 140, but is not limited thereto.

The light emitting element EL which includes the light emitting layer 172 can be disposed on the second intermediate layer 160 and the bank layer 165. The light emitting element EL can include the anode electrode 171, at least one light emitting layer 172 disposed on the anode electrode 171, and a cathode electrode 173 formed on the light emitting layer 172.

The anode electrode 171 can be electrically connected to the connection electrode 155 disposed on the first intermediate layer 150 through a contact hole penetrating the second intermediate layer 160.

The anode electrode 171 of each pixel is formed to be exposed by the bank layer 165. The bank layer 165 can be formed of a non-transparent material (for example, black) so as to prevent or reduce an optical interference between adjacent pixels. In this case, the bank layer 165 can include a light shielding material formed of at least one among a color pigment, organic black and carbon, but is not limited thereto.

At least one light emitting layer 172 can be formed on the anode electrode 171 in the light emitting region provided by the bank layer 165. The at least one light emitting layer 172 can include a hole transport layer, a hole injection layer, an electron blocking layer, the light emitting layer 172, an electron injection layer, a hole blocking layer, and an electron transport layer on the anode electrode 171, and can be formed by laminating the above mentioned layers in a sequential order or a reverse order according to a light emitting direction. In addition, the light emitting layer 172 can include first and second light emitting stacks facing each other with an electron generation layer interposed therebetween. In such a case, the light emitting layer 172 of one among the first and the second light emitting stacks generates a blue light, and the light emitting layer 172 of the other one thereamong generates yellow-green light, thereby white light can be generated through the first and the second light emitting stacks. The white light generated by the light emitting stacks enters a color filter positioned on or below the light emitting layer 172, thereby a color image can be implemented. As another example, without a separate color filter, each light emitting layer 172 can implement a color image by generating color light corresponding to each pixel. For example, the light emitting layer 172 of a red pixel can generate red light, the light emitting layer 172 of a green pixel can generate green light, and the light emitting layer 172 of a blue pixel can generate blue light.

The cathode electrode 173 can be formed to face the anode electrode 171 with the light emitting layer 172 interposed therebetween, and can receive a low potential driving voltage EVSS.

The encapsulation layer 180 can block moisture from the outside or oxygen from permeating the light emitting element EL which is vulnerable to the moisture from the outside or oxygen. To this end, the encapsulation layer 180 can have an inorganic encapsulation layer structured as at least one layer, and an organic encapsulation layer structured as at least one layer, but is not limited thereto. In the present disclosure, the encapsulation layer 180 on which the first encapsulation layer 181, the second encapsulation layer, and the third encapsulation layer 183 are sequentially laminated is taken as an example.

The first encapsulation layer 181 is formed on the substrate 101 on which the cathode electrode 173 is formed. The third encapsulation layer 183 is formed on the substrate 101 on which the second encapsulation layer 182 is formed, and can be formed to surround an upper surface, a lower surface, and a side surface of the second encapsulation layer 182 together with the first encapsulation layer 181. The first encapsulation layer 181 and the third encapsulation layer 183 can minimize or prevent or reduce moisture from the outside or oxygen permeating the light emitting element EL. The first encapsulation layer 181 and the third encapsulation layer 183 can be formed of an inorganic insulating material with which a low-temperature lamination is possible, such as silicon nitride SiNx, silicon oxide SiOx, silicon oxynitride SiON, or aluminum Oxide Al2O3. The first encapsulation layer 181 and the third encapsulation layer 183 are laminated in a low-temperature atmosphere, and thus, can prevent the light emitting element EL which is vulnerable in a high temperature atmosphere from being damaged during the lamination process.

The second encapsulation layer 182 plays the role of a buffer which alleviates a tension between layers caused by bending of the display device 10, and can planarize a stepped portion between layers. The second encapsulation layer 182 can be formed of a non-photosensitive organic insulating material such as an acryl resin, an epoxy resin, a phenolic resin, a polyamide resin, a polyimide resin, and polyethylene or silicon oxycarbonate SiOC, or a photosensitive organic insulating material such as photo acryl, but is not limited thereto. When the second encapsulation layer 182 is formed in an ink jet manner, a dam DAM for preventing the second encapsulation layer 182 in a liquid form from dispersing to an edge of the substrate 101 can be disposed. The dam DAM can be disposed closer to the edge of the substrate 101 than the second encapsulation layer 182. Through the dam DAM, it is possible to prevent dispersion of the second encapsulation layer 182 toward a pad region in which a conductive pad is disposed, which is subjected to position at an outermost side.

The dam DAM is disposed for the purpose of preventing dispersion of the second encapsulation layer 182, however, when the second encapsulation layer 182 is formed to excess a height of the dam DAM during the process, because the second encapsulation layer 182 which is an organic layer can be exposed to the outside, permeation of the moisture and the like to an inside of the light emitting element EL can be made easier. Therefore, the dam DAM can be formed at least ten or more in number to be redundantly formed in order to prevent or reduce such permeation.

The dam DAM can be disposed on the inter-layer insulating layer disposed on the third insulation layer 135 in the non-display region NA. The embodiments of the present disclosure are not limited thereto, and the inter-layer insulating layer can be the third insulation layer 135.

In addition, the dam DAM can include a first dam DAM1 and a second dam DAM2.

The first dam DAM1 can be formed simultaneously with the second intermediate layer 160 and the bank layer 165. When the second intermediate layer 160 is formed, a lower layer is formed theretogether and when the bank layer 165 is formed, an upper layer is formed theretogether, thereby the dam DAM can be laminated in a dual structure.

In the first dam DAM1, a metal layer formed of the same material as the anode electrode 171 can be disposed between the upper layer and the lower layer, and a metal layer formed of the same material as the source and drain electrode 140 and a metal layer formed of the same material as the connection electrode 155 can be disposed to be in contact with each other below the lower layer.

The second dam DAM2 can be formed simultaneously with the first intermediate layer 150, the second intermediate layer 160, and the bank layer 165. When the first intermediate layer 150 is formed, a lower layer of the dam DAM is formed theretogether, when the second intermediate layer 160 is formed, an intermediate layer of the dam DAM is formed theretogether, and when the bank layer 165 is formed, an upper layer of the dam DAM is formed theretogether, thereby the dam DAM can be laminated in a triple structure.

In the second dam DAM2, a metal layer formed of the same material as the anode electrode 171 can be disposed between the upper layer and the lower layer, and a metal layer formed of the same material as the connection electrode 155 can be disposed between the intermediate layer and the lower layer, and a metal layer formed of the same material as the source and drain electrode 140 of the thin film transistor TFT1 and TFT2 can be disposed below the lower layer.

Therefore, the dam DAM can be formed of the same material as the first intermediate layer 150, the second intermediate layer 160, and the bank layer 165, but is not limited thereto. In addition, the dam DAM can have a structure in which at least one insulation layer including the inter-layer insulation layer 128 is further disposed below the first intermediate layer 150.

The dam DAM can overlap a low potential driving power line VSS. For example, the low potential driving power line VSS can be formed below a region in which the dam DAM is disposed in the non-display region NA.

The low potential driving power line VSS and the gate driver 300 configured in the GIP (gate-in-panel) manner are formed in a shape surrounding an outside of the display panel, and the low potential driving power line VSS can be disposed on an outer side than the gate driver 300. In addition, the low potential driving power line VSS can be connected to the anode electrode 171 and can apply a common voltage. The gate driver 300 is illustrated simply in a plan view and a cross-sectional view, however, can be configured using a thin film transistor having the same structure as the thin film transistor provided in the display region AA.

The low potential driving power line VSS can be disposed on an outer side than the gate driver 300. The low potential driving power line VSS can be disposed on an outer side than the gate driver 300 and surrounds the display region AA.

The low potential driving power line VSS can be disposed on the same layer as the connection electrode 155 on the first intermediate layer 150. Alternatively, the low potential driving power line VSS can be disposed on the same layer as the source and drain electrode 140 of the thin film transistor TFT on the third insulation layer 135, or can be disposed on the same layer as the gate electrode 125 of the thin film transistor TFT on the second insulation layer 120. The embodiments of the present disclosure are not limited thereto.

In addition, the low potential driving power line VSS can be electrically connected to the anode electrode 171 in the non-display region NA. The low potential driving power line VSS can supply the low potential driving voltage EVSS to the plurality of pixels in the display region AA.

At least one power line VL can be disposed between the gate driver 300 and the display region AA. At least one power line VL can be disposed on the same layer as the source and drain electrode 140 of the thin film transistor TFT. Of course, the embodiments of the present disclosure are not limited thereto. At least one power line VL is simply illustrated on the cross-sectional view, however, can be disposed on the same layer as an anode reset voltage bus line and a reference voltage bus line to be in parallel thereto. Alternatively, the anode reset voltage bus line and the reference voltage bus line can be disposed in parallel to the other layer, or can be disposed to overlap the other layer. The anode reset voltage bus line can supply an anode reset voltage Var to the plurality of pixels. The reference voltage bus line can supply the plurality of pixels of the display region AA with the reference voltage Vref. At least one power line VL is illustrated to be disposed between the gate driver 300 and the display region AA, but the embodiments of the present disclosure are not limited thereto.

A touch layer 190 can be disposed on the encapsulation layer 180. A touch buffer layer 191 can be disposed between a touch sensor metal including touch electrode connection lines 192 and touch electrodes 194, 195 and 196, and the cathode electrode 173 of the light emitting element EL on the touch layer 190.

The touch buffer layer 191 can block permeation of a liquid chemical (a developing solution or an etching solution) used in the manufacturing process of the touch sensor metal disposed on the touch buffer layer 191 or moisture from the outside from permeating the light emitting layer 172 which includes an organic material. Therefore, the touch buffer layer 191 can prevent or reduce damage of the light emitting layer 172 vulnerable to the liquid chemical or the moisture.

The touch buffer layer 191 is formed of an organic insulating material which can be formed at a low temperature below a certain temperature (e.g., 100° C.) and has a low dielectric constant of 1 to 3 so as to prevent or reduce damage of the light emitting layer 172 which includes an organic material vulnerable to the high temperature. For example, the touch buffer layer 191 can be formed of an acryl-based material, an epoxy-based material or a siloxane-based material. The touch buffer layer 191 formed of the organic insulating material and having a planarization function can prevent or reduce damage of the encapsulation layer 180 and a breaking phenomenon of the touch sensor metal formed on the touch buffer layer 191 caused because of bending of the organic electroluminescent display device.

According to the touch sensor structure based on a mutual capacitance, touch electrodes 194, 195 and 196 are disposed on the touch buffer layer 191, and the touch electrodes 194, 195 and 196 can intersect each other.

The touch electrode connection line 192 can electrically connect the touch electrodes 195 and 196 to each other. The touch electrode connection line 192 and the touch electrodes 194, 195 and 196 can be formed in different layers, with the touch insulation layer 193 interposed therebetween.

The touch electrode connection line 192 can overlap the bank layer 165, and thus, can prevent or reduce decrease of an opening ratio.

Meanwhile, the touch electrodes 194, 195 and 196 are in a dual wiring routing structure which overlaps a portion of the touch electrode connection line 192, and can be electrically connected to a touch driving circuit through the pad part 198 by passing an upper portion and a side surface of the encapsulation layer 180, and an upper portion and a side surface of the dam DAM.

The dual wiring routing structure of the touch electrodes 194, 195 and 196 formed with the portion of the touch electrode connection line 192 can receive the touch driving signal from the touch driving circuit, transmit the signal to the touch electrodes 194, 195 and 196, and transmit the touch sensing signal at the touch electrodes 194, 195 and 196 to the driving circuit.

A touch protection layer 197 can be disposed on the touch electrodes 194, 195 and 196. The touch protection layer 197 is disposed on the touch electrodes 194, 195 and 196 in the drawing, however, is not limited thereto, and the touch protection layer 197 can extend before or after the dam DAM to be disposed in the dual wiring routing structure formed with the touch electrodes 194, 195 and 196 and the touch electrode connection line 192.

A touch pad can be configured by including a first pad layer formed on the same layer and formed of the same material as the gate electrode 126, a second pad layer formed on the same layer and formed of the same material as the source and drain electrode 140, and a third pad layer formed on the same layer and formed of the same material as the touch electrodes 194, 195 and 196 or the touch electrode connection line 192.

In addition, a color filter can be further disposed on the encapsulation layer 180, and the color filter can be disposed on the touch layer 190, or can be disposed between the encapsulation layer 180 and the touch layer 190.

Figure 3:
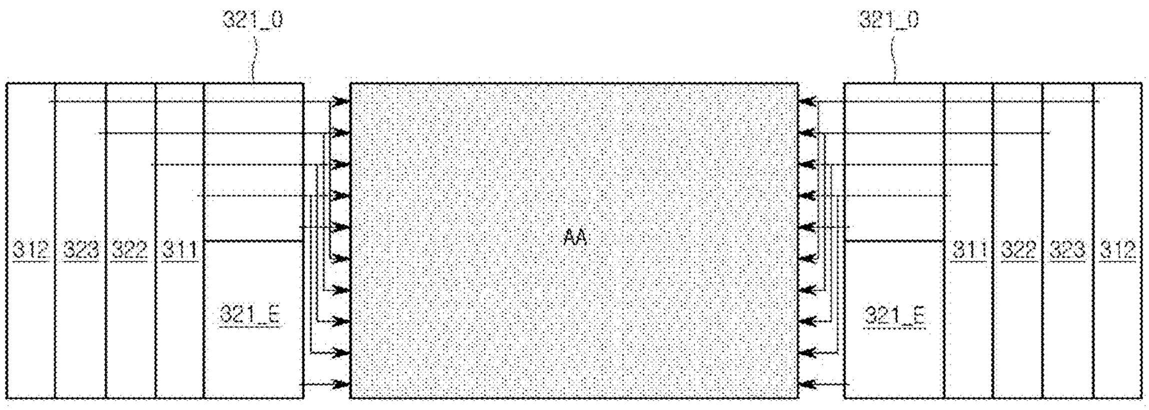
FIG. 3 is a view illustrating a configuration of a gate driver in a display device according to an embodiment of the present disclosure.

FIG. 3 is a view illustrating a configuration of the gate driver in the display device according to an embodiment of the present disclosure.

Referring to FIG. 3, the gate driver 300 can configured with a light emitting control driver 310, and a scan driver 320. The light emitting control driver 310 can be configured with a first light emitting control driver 311 and a second light emitting control driver 312. The scan driver 320 can be configured with first to third scan drivers 321, 322 and 323. In addition, the first scan driver 321 can be configured with an odd-numbered first scan driver 321_O and an even-numbered first scan driver 321_E. In other words, each of stages STG1 to STGn of the shift register can include first scan signal generators 321_O(1) to 321_O(n) and 321_E(1) to 321_E(n), second scan signal generators 322(1) to 322(*n*), third scan signal generators 323(1) to 323(*n*), first light emission control signal generators 311(1) to 311(*n*), and second light emission control signal generators 312(1) to 312(*n*), where n can be a real number such as a natural number.

In the gate driver 300, the shift registers can be symmetrically formed on both sides of the display region AA.

In the display panel 100, the scan driver 320 can be disposed closer to the display region AA than does the light emission control driver 310. For example, the first scan drivers 321_O and 321_E can be disposed adjacent to the display region AA. The second light emission control driver 312 can be disposed on an outermost side, and the first light emission control driver 311 can be disposed between the first scan drivers 321_O and 321_E and the second scan driver 322.

However, the disclosed technology is not limited thereto, and the light emission control driver 310 can be disposed on the outermost side of the display panel 100 according to the embodiments.

In addition, the first scan drivers 321_O and 321_E can be divided into the odd-numbered scan driver 321_O and the even-numbered scan driver 321_E, and the odd-numbered scan driver 321_O and the even-numbered scan driver 321_E can be disposed on both sides of the display region AA. By driving the first scan drivers 321_O and 321_E by dividing them into the odd-numbered scan driver 321_O and the even-numbered scan driver 321_E, it is possible to sufficiently secure time required for application of the data voltage Vdata. In addition, by disposing the odd-numbered scan driver 321_O and the even-numbered scan driver 321_E on both sides of the display region AA, it is possible to reduce a deviation of the application time per pixel of the data voltage Vdata. Accordingly, by driving the first scan drivers 321_O and 321_E, it is possible to sufficiently secure time required for application of the data voltage Vdata, and to reduce a deviation of the application time per pixel, thereby becoming able to improve the image quality of the display panel.

Each of the first to the second light emission control drivers 311 and 312 and the first to the third scan drivers 321 to 323 can be driven by receiving each separate start signal and clock signal through at least one start signal line and a plurality of clock signal lines.

At this instance, each clock signal can have a different phase, and clock signals applied to the same gate driver can be applied through adjacent clock signal lines. In other words, each of the first to the second light emission control drivers 311 and 312 and the first to the third scan drivers 321 to 323 can output a gate signal to the pixel circuit by receiving one start signal and clock signal, and the clock signal which includes a first clock signal and a second clock signal is driven. The first clock signal and the second clock signal are applied through clock signal lines adjacent to each other, and adjacent clock signal lines can be configured as a pair.

Power lines such as the anode reset voltage bus line and the reference voltage bus line can be disposed between the gate driver 300 and the display region AA.

The power lines can supply the reference voltage Vref and the anode reset voltage Var of the direct current voltage DC from the power supply unit 500 to the pixels SP through a power link line branched off from the anode reset voltage bus line and the reference voltage bus line.

The power line can have a shape of which both sides of the display region AA are symmetrical, and can be disposed on one side only, such as a left side, or a right side. In addition, even if disposed on one side, the position on the left or right is not limited.

When it comes to the power line and the power link line, at least some of the thin film transistor TFT can be formed on the same layer and formed of the same material as the source electrode or the drain electrode 140, and can be formed on the same layer and formed of the same material as the connection electrode 155.

In addition, at least some of the power line and the power link line can be formed on the same layer and formed of the same material as the gate electrodes 125 and 126, or can be formed on the same layer and formed of the same material as the semiconductor layers 115 and 116. Moreover, at least some of the power line and the power link line can be formed on the same layer and formed of the same material as the touch electrode connection lines 192 and 194, or the touch electrodes 195 and 196, or can be formed on the same layer and formed of the same material as the shielding metal 102.

Figure 4:
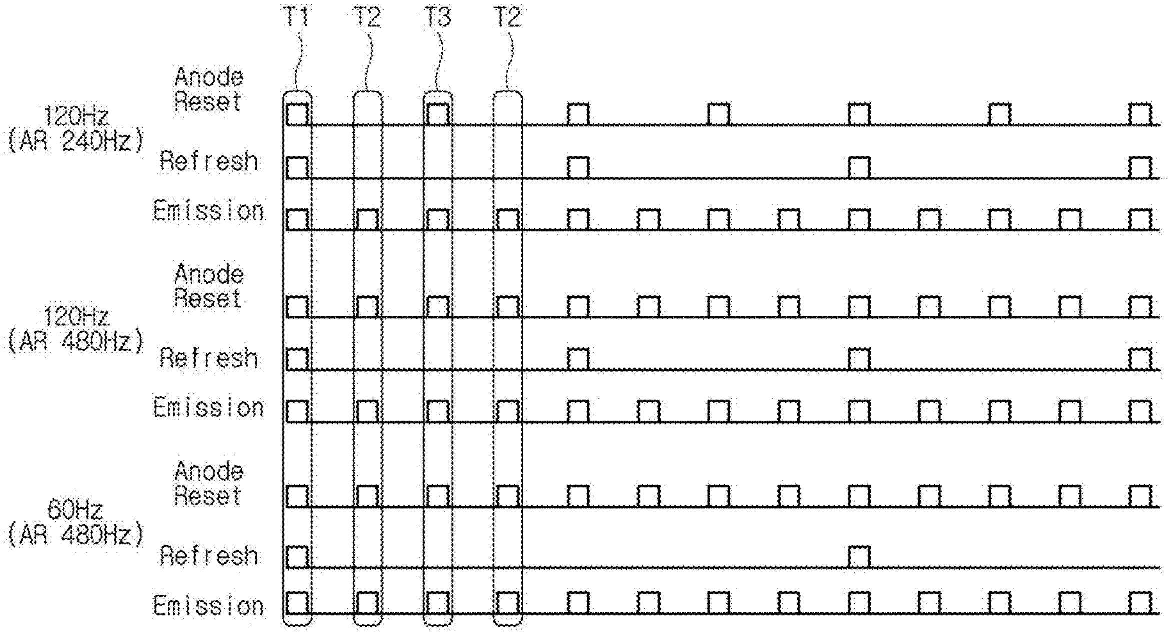
FIG. 4 is a view illustrating an operation according to a driving frequency in a display device according to an embodiment of the present disclosure.

FIG. 4 is a view illustrating an operation according to a driving frequency in the display device according to an embodiment of the present disclosure.

Referring to FIG. 4, the display device according to an embodiment of the present disclosure can be driven in a variable refresh rate (VRR) mode. The VRR mode allows to increase a refresh rate at which the data voltage Vdata is updated at a time point when a high-speed driving is required to drive the pixels, while operating the pixels at a constant frequency, or to decrease the refresh rate when power consumption reduction or a low-speed driving is required to drive the pixels.

The pixel SP can be driven through combination of a refresh period T1, a light emission control period T2, and an anode reset period T3 in one frame. The refresh period T1 is a period at which deterioration of the driving element DT is sensed, and a new data voltage Vdata is applied, and the light emission control period T2, and the anode reset period T3 can maintain and use the data voltage Vdata of the refresh period T1 as it is.

The light emission control period T2 can achieve the same effect as driving the light emitting element EL at a high frequency, by blocking or supplying a current supplied to the light emitting element EL so that the light emitting element EL repeats turning on and turning off during a light emission period in which the light emitting element EL emits light.

At the anode reset period T3, the anode reset voltage Var is applied to the anode electrode 171 of the light emitting element EL to reset the voltage, and the light emitting element EL can emit light according to the data voltage Vdata applied at the refresh period T1.

In addition, according to the driving frequency, a cycle of the refresh period T1, the light emission control period T2, and the anode reset period T3 can be different. For example, if the driving frequency is 60 Hz, the light emission control period T2 and the anode reset period T3 can be repeated eight times when the refresh period T1 is driven one time during one frame. In addition, if the driving frequency is 120 Hz, the light emission control period T2 and the anode reset period T3 can be repeated four times when the refresh period T1 is driven one time during one frame. However, the disclosed technology is not limited thereto, and it can be driven such that the light emission control period T2 can be repeated four times and the anode reset period T3 can be repeated two times when the refresh period T1 is driven once during one frame.

As such, the light emission control period T2 and the anode reset period T3 is driven more than the refresh period T1, and an effect of driving at a higher frequency than an actual frequency can be achieved.

Detailed operation of each of the refresh period T1, the light emission control period T2 and the anode reset period T3 will be described referring to FIGS. 5 to 6C.

Figure 5:
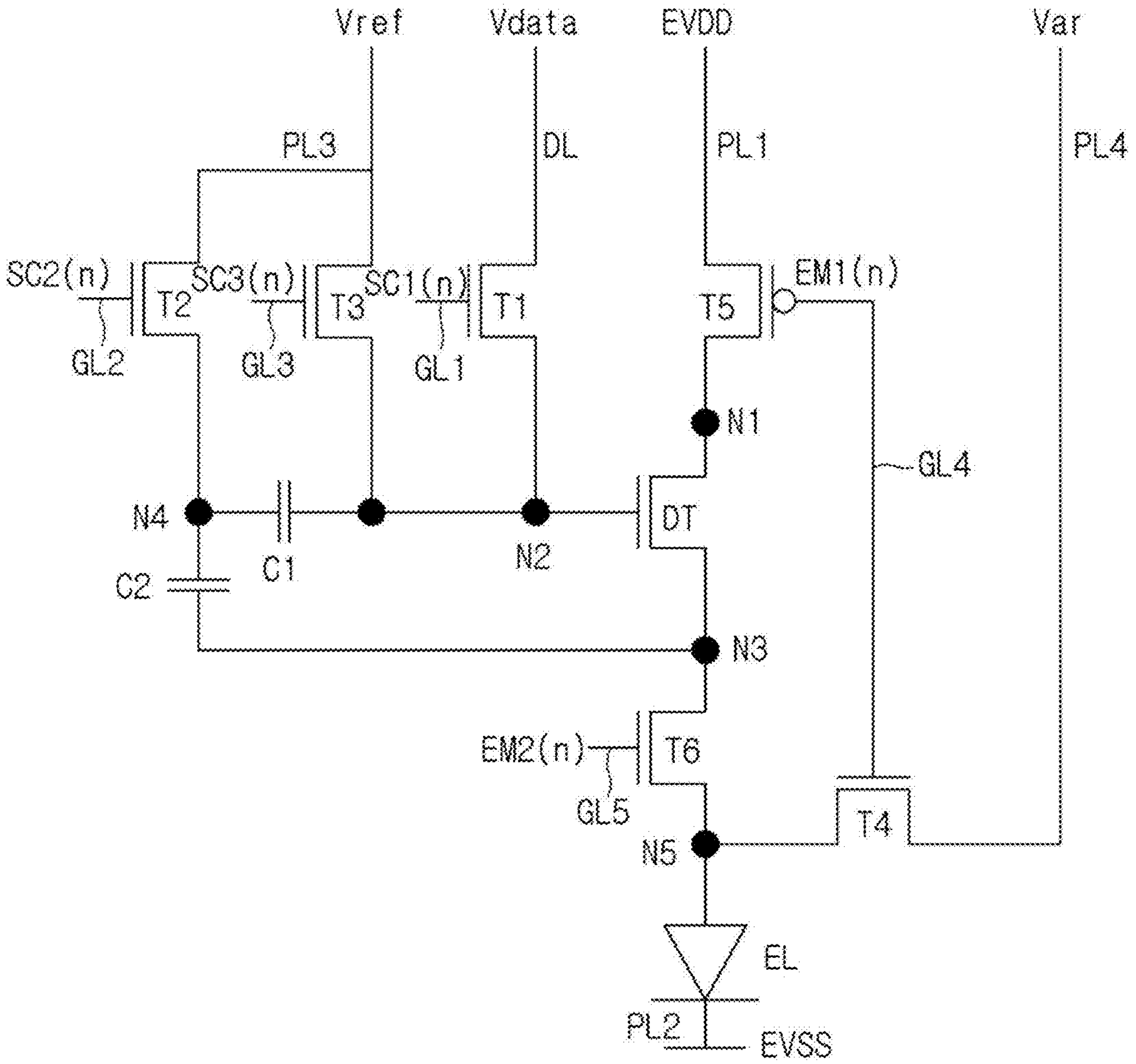
FIG. 5 is a diagram of a pixel circuit in a display device according to an embodiment of the present disclosure.

FIG. 5 is a diagram of the pixel circuit in the display device according to an embodiment of the present disclosure.

Referring to FIG. 5, the pixel circuit includes the light emitting element EL, a driving element DT configured to drive the light emitting element EL, a plurality of switching elements T1 to T6, a first capacitor C1, and a second capacitor C2. The driving element DT and the first, second, third, fourth, and sixth switching elements T1, T2, T3, T4 and T6 can be implemented as n-channel oxide TFTs, and the fifth switching element T5 can be implemented as a p-channel LTPS TFT. However, the disclosed technology is not limited thereto, and according to a design, the driving element DT and the switching elements can be implemented as an n-channel LTPS TFT or a p-channel oxide TFT.

The pixel circuit is connected to the data line DL to which the data voltage Vdata is applied, and to the gate lines GL1 to GL6 to which the gate signals SC1(*n*), SC2(*n*), SC3(*n*), EM1(*n*) and EM2(*n*) are applied. The pixel circuit is connected to power nodes to which a direct current voltage (or a constant voltage) is applied, such as a first constant voltage node PL1 to which the high potential driving voltage EVDD is applied, a second constant voltage node PL2 to which the low potential driving voltage EVSS is applied, a third constant voltage node PL3 to which the reference voltage Vref is applied, and a fourth constant voltage node PL4 to which the anode reset voltage Var is applied. The power lines to which the constant voltage nodes are connected can be commonly connected to all pixels on the display panel.

The pixel voltages such as the high potential driving voltage EVDD, the reference voltage Vref, the low potential driving voltage EVSS, the anode reset voltage Var, the gate high voltage VGH, the gate low voltage VGL, and the like can be set in the same manner as described above.

The gate signals SC1(*n*), SC2(*n*), SC3(*n*), EM1(*n*) and EM2(*n*) include a pulse which swings between the gate high voltage VGH and the gate low voltage VGL. The gate signals SC1(*n*), SC2(*n*), SC3(*n*), EM1(*n*) and EM2(*n*) include a first scan signal SC1(*n*), a second scan signal SC2(*n*), a third scan signal SC3(*n*), a first light emission control signal EM1(*n*), and a second light emission control signal EM2(*n*). At the refresh period, the driving period of the pixel circuit includes a first period I1, a second period I2, a third period I3, a fourth period I4, and a fifth period I5, and can be determined by a waveform of the gate signals SC1(*n*), SC2(*n*), SC3(*n*), EM1(*n*) and EM2(*n*).

The gate driver 300 can include the shift register configured to sequentially output the first scan signal SC1(*n*), a first edge trigger configured to sequentially output the second scan signal SC2(*n*), a second edge trigger configured to sequentially output the third scan signal SC3(*n*), a third edge trigger configured to sequentially output the first light emission control signal EM1(*n*), and a fourth edge trigger configured to sequentially output the second light emission control signal EM2(*n*).

A voltage of the first scan signal SC1(*n*) is generated as a pulse of the gate high voltage VGH at the third period I3, and as a pulse of the gate low voltage VGL at the first period I1, the second period I2, the fourth period I4, and the fifth period I5.

A voltage of the second scan signal SC2(*n*) is generated as a pulse of the gate high voltage VGH at the first period to the third periods I1, I2 and I3, and as a pulse of the gate low voltage VGL at the fourth period I4, and the fifth period I5.

A voltage of the third scan signal SC3(*n*) is generated as a pulse of the gate high voltage VGH at the first period I1 and the second period I2, and as a pulse of the gate low voltage VGL at the third to the fifth periods I3, I4 and I5.

A voltage of the first light emission control signal EM1(*n*) is generated as a pulse of the gate high voltage VGH at the first period I1, as a pulse of the gate low voltage VGL at the second period I2, and as a pulse of the gate high voltage VGH at the third period I3 and the fourth period I4. A voltage of the first light emission control signal EM1(*n*) is generated as a pulse of the gate low voltage VGL at the fifth period I5.

A voltage of the second light emission control signal EM2(*n*) is generated as a pulse of the gate high voltage VGH at the first period I1, and as a pulse of the gate low voltage VGL at the second and the third periods I2 and I3. A voltage of the second light emission control signal EM2(*n*) is generated as a pulse of the gate high voltage VGH at the fourth and the fifth periods I4 and I5.

After a voltage of the first light emission control signal EM1(*n*) is inverted into the gate high voltage VGH between the second period I2 and the third period I3, a voltage of the third scan signal SC3(*n*) is inverted into the gate low voltage VGL, and then, a voltage of the first scan signal SC1 can be inverted into the gate high voltage VGH. After a voltage of the first scan signal SC1(*n*) is inverted into the gate low voltage VGL between the third period I3 and the fourth period I4, a voltage of the second scan signal SC2(*n*) is inverted into the gate low voltage VGL, and then, a voltage of the second light emission control signal EM2(*n*) can be inverted into the gate high voltage VGH.

The driving element DT includes a first electrode connected to a first node N1, a gate electrode connected to a second node N2, and a second electrode connected to a third node N3.

The light emitting element EL can be implemented as an OLED. The light emitting element EL includes the anode electrode 171, the cathode electrode 173, and the light emission layer 172 formed between the anode electrode 171 and the cathode electrode 173. The anode electrode 171 of the light emitting element EL is connected to the fifth node N5, and the cathode electrode 173 is connected to the second constant voltage node PL2 to which the low potential driving voltage EVSS is applied.

After a threshold voltage Vth of the driving element DT is stored in the second capacitor C2, a data voltage Vdata of the pixel data is stored in the first capacitor C1. The first capacitor C1 is connected between the second node N2 and a fourth node N4 and stores a data voltage Vdata at the third period I3. The second capacitor C2 is connected between the third node N3 and the fourth node N4 and stores the threshold voltage Vth of the driving element DT sensed at the second period I2.

The switching elements T1 to T6 of the pixel circuit include the first switching element T1 configured to supply a data voltage Vdata of the pixel data to the second node N2 in response to the first scan signal SC1(*n*), the second switching element T2 configured to supply a reference voltage Vref to the fourth node N4 in response to the second scan signal SC2(*n*), the third switching element T3 configured to supply a reference voltage Vref to the second node N2 in response to the third scan signal SC3(*n*), the fourth switching element T4 configured to supply an anode reset voltage Var to the fifth node N5 in response to the first light emission control signal EM1(*n*), the fifth switching element T5 configured to supply an high potential driving voltage EVDD to the first node N1 in response to the first light emission control signal EM1(*n*), and the sixth switching element T6 configured to connect the third node N3 to the fifth node N5 in response to the second light emission control signal EM2(*n*).

The first switching element T1 is turned on in response to a pulse of the first scan signal SC1(*n*) synchronized with a data voltage Vdata of the pixel data at the third period I3. The first switching element T1 is turned off at the first period I1, the second period I2, the fourth period I4, and the fifth period I5. When the first switching element T1 is turned on, the data line DL is electrically connected to the second node N2, thereby the data voltage Vdata is applied to the second node N2. The first switching element T1 includes a first electrode connected to the data line DL to which a data voltage Vdata is applied, a gate electrode connected to the first gate line GL1 to which the first scan signal SC1(*n*) is applied, and a second electrode connected to the second node N2.

The second switching element T2 is turned on in response to a pulse of the second scan signal SC2(*n*) generated as a gate high voltage VGH at the first to the third periods I1 to I3. When the second switching element T2 is turned on, a reference voltage Vref is applied to the fourth node N4. The second switching element T2 is turned off at the fourth and the fifth periods I4 and I5. The second switching element T2 includes a first electrode connected to the third constant voltage node PL3 to which a reference voltage Vref is applied, a gate electrode connected to a second gate line GL2 to which the second scan signal SC2(*n*) is applied, and a second electrode connected to the fourth node N4.

The third switching element T3 is turned on in response to a pulse of the third scan signal SC3(*n*) generated as a gate high voltage VGH at the first to the second periods I1 to I2. When the third switching element T3 is turned on, a reference voltage Vref is applied to the second node N2. The third switching element T3 is turned off at the third to the fifth periods I3, I4 and I5. The third switching element T3 includes a first electrode connected to the third constant voltage node PL3 to which a reference voltage Vref is applied, a gate electrode connected to a third gate line GL3 to which the third scan signal SC3(*n*) is applied, and a second electrode connected to the second node N2.

The fourth switching element T4 is turned on in response to a pulse of the first light emission control signal EM1(*n*) generated as a gate high voltage VGH at the first period I1, the third period I3 and the fourth period I4. When the fourth switching element T4 is turned on, and an anode reset voltage Var is applied to the fifth node N5. The fourth switching element T4 is turned off at the second period I2 and the fifth period I5. The fourth switching element T4 includes a first electrode connected to the fifth node N5, a gate electrode connected to a fourth gate line GL4 to which the first light emission control signal EM1(*n*) is applied, and a second electrode connected to the fourth constant voltage node PL4 to which an anode reset voltage Var is applied.

The fifth switching element T5 is turned on in response to a pulse of the first light emission control signal EM1(*n*) generated as a gate high voltage VGH at the second period I1 and the fifth period I5, and supplies the high potential driving voltage EVDD to the first node N1. The fifth switching element T5 is turned off at the first period I1, the third period I3, and the fourth period I4. The fifth switching element T5 includes a first electrode connected to the first constant voltage node PL1 to which a high potential driving voltage EVDD is applied, a gate electrode connected to the fourth gate line GL4 to which the first light emission control signal EM1(*n*) is applied, and a second electrode connected to the first node N1.

The sixth switching element T6 is turned on in response to a gate high voltage VGH of the second light emission control signal EM2(*n*) at the first period I1, the fourth period I4, and the fifth period I5. When the sixth switching element T6 is turned on, the third node N3 is electrically connected to the fifth node N5, and a current from the driving element DT can flow to the light emitting element EL. The sixth switching element T6 is turned off at the second period I2 and the third period I3. The sixth switching element T6 includes a first electrode connected to the third node N3, a gate electrode connected to the fifth gate line GL5 to which the second light emission control signal EM2(*n*) is applied, and a second electrode connected to the fifth node N5.

Figure 6A:
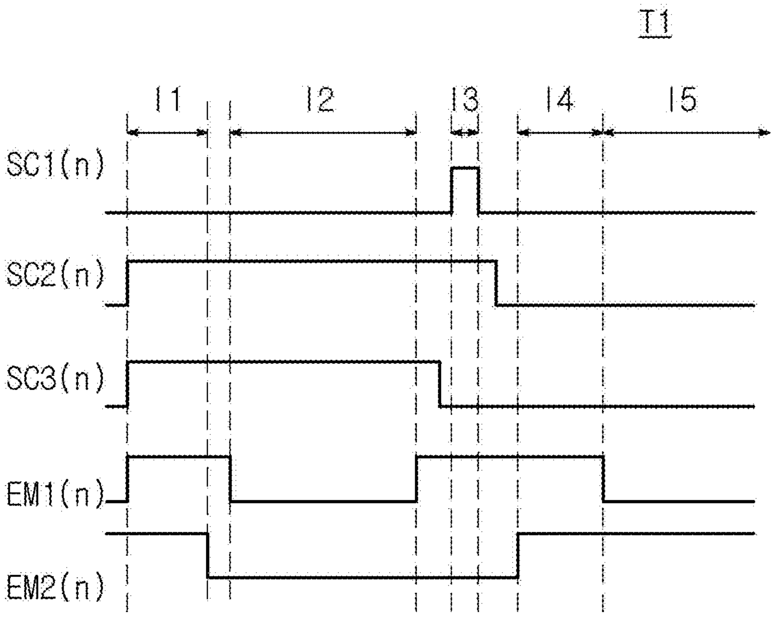
FIGS. 6A to 6C are operation timing charts of a pixel circuit illustrated in FIG. 4.
Figure 6B:
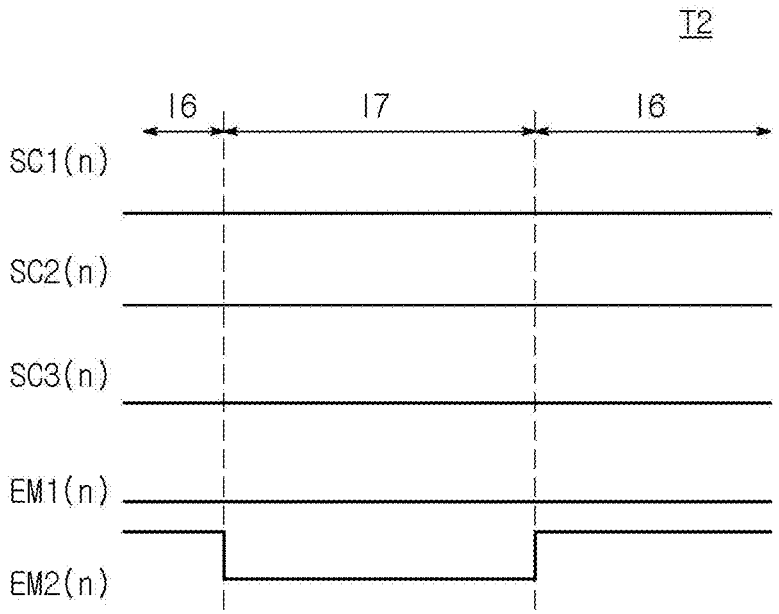
Figure 6C:
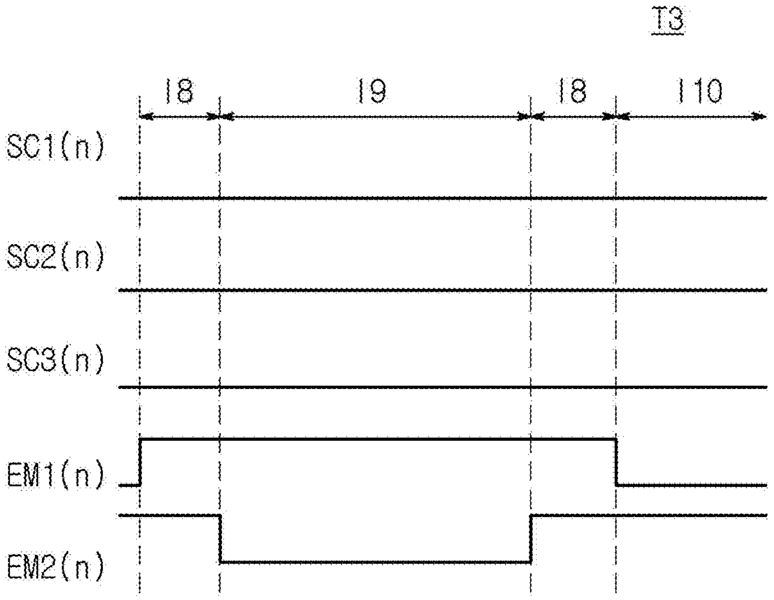

FIGS. 6A to 6C are operation timing charts of the pixel circuit illustrated in FIG. 4.

Particularly, FIGS. 6A to 6C are diagrams showing a driving period of the pixel circuit illustrated in FIG. 5 step by step. FIG. 6A is an operation timing diagram of the refresh period T1, FIG. 6B is an operation timing diagram of the light emission control period T2, and FIG. 6C is an operation timing diagram of the anode reset period T3.

Referring to FIG. 6A, major nodes of the pixel circuit are reset at the first period I1 of the refresh period T1. At the first period I1, a voltage of the second scan signal SC2(*n*), the third scan signal SC3(*n*), the first light emission control signal EM1(*n*), and the second light emission control signal EM2(*n*) is a gate high voltage VGH. At the first period I1, a voltage of the first scan signal SC1(*n*) and the first light emission control signal EM1(*n*) is a gate low voltage VGL. Therefore, at the first period I1, the second, third, fourth, and sixth switching elements T2, T3, T4 and T6 are turned on, and the first and fifth switching elements T1 and T5 are turned off. As a result, at the first period I1, a voltage of the second node N2 and the fourth node N4 is reset to a reference voltage Vref, and a voltage of the third node N3 and the fifth node N5 is reset to an anode reset voltage Var. At the first period I1, because the same reference voltage Vref is applied to the second node N2 and the fourth node N4, a voltage of the first capacitor C1 is 0 [V]. A voltage of the second capacitor C2 and a gate-to-source voltage Vgs of the driving element DT is Vref-Var at the first period I1.

Next, at the second period I2, the threshold voltage Vth of the driving element DT is sensed and is stored in the second capacitor C2. At the second period I2, a voltage of the second scan signal SC2(*n*) and the third scan signal SC3(*n*) is a gate high voltage VGH. At the second period I2, a voltage of the first scan signal SC1(*n*), the first light emission control signal EM1(*n*) and the second light emission control signal EM2(*n*) is a gate low voltage VGL. At the second period I2, the second, third, and fifth switching elements T2, T3 and T5 are turned on, and the driving element DT is turned on. At the second period I2, the first, fourth and the sixth switching elements T1, T4 and T6 are turned off. At the second period I2, when a voltage of the second capacitor C2 reaches the threshold voltage Vth of the driving element DT, and the driving element DT is turned off.

When the second period I2 ends, a voltage of the second node N2 is a reference voltage Vref, and a voltage of the third node N3 is Vref-Vth. Here, 'Vth' is a threshold voltage of the driving element DT. Therefore, when the second period I2 ends, a voltage of the second capacitor C2 and a gate-to-source voltage Vgs of the driving element DT is the threshold voltage Vth of the driving element DT. When the second period I2 ends, a voltage of the fifth node N5 is an anode reset voltage Var, thus, the light emitting element EL does not emit light at the second period I2. At the second period I2, a voltage of the first capacitor C1 is 0[V].

At the third period I3, a data voltage Vdata is stored in the first capacitor C1. At the third period I3, a voltage of the first scan signal SC1(*n*), the second scan signal SC2(*n*), and the first light emission control signal EM1(*n*) is a gate high voltage VGH. At the third period I3, a voltage of the third scan signal SC3(*n*) and the second light emission control signal Em2(*n*) is a gate low voltage VGL. At the third period I3, the first, second and fourth switching elements T1, T2 and T4 are turned on, and the third, fifth and sixth switching elements T3, T5 and T6 are turned off. At the third period I3, a data voltage Vdata is applied to the second node N2 through the first switching element T1, and a reference voltage Vref is applied to the fourth node N4 through the second switching element T2.

When the third period I3 ends, a voltage of the second node N2 is a data voltage Vdata, and a voltage of the first capacitor C1 is Vdata-Vref. When the third period I3 ends, a voltage of the third node N3 is Vref-Vth, and a voltage of the second capacitor C2 is the threshold voltage Vth of the driving element DT. When the third period I3 ends, a gate-to-source voltage Vgs of the driving element DT is Vdata-Vref+Vth.

At the fourth period I4, the anode electrode 171 of the light emitting element EL can be reset to the anode reset voltage Var. At the fourth period I4, a voltage of the first light emission control signal EM1(*n*) and the second light emission control signal EM2(*n*) is a gate high voltage VGH. At the fourth period I4, a voltage of the first scan signal SC1(*n*), the second scan signal SC2(*n*) and the third scan signal SC3(*n*) is a gate low voltage VGL. Therefore, at the fourth period I4, the fourth and sixth switching elements T4 and T6 are turned on, and the first, second, third, and fifth switching elements T1, T2, T3 and T5 are turned off.

When the fourth period I4 ends, a voltage of the third node N3 and the fifth node N5 is an anode reset voltage Var. When the fourth period I4 ends as an anode reset voltage Var applied to the third node N3 through capacitor coupling is transmitted to the second node N2, a voltage of the second node N2 is (Vdata−Vref+Vth)+Var. When the fourth period I4 ends, a voltage of the first capacitor C1 is Vdata-Vref, and a voltage of the second capacitor C2 is the threshold voltage Vth of the driving element DT. When the fourth period I4 ends, a gate-to-source voltage Vgs of the driving element DT is Vdata−Vref+Vth.

At the fifth period I5, the driving element DT drives the light emitting element EL by generating a current according to the gate-to-source voltage Vgs. The light emitting element EL can emit light at luminance corresponding to a gray scale value of pixel data by a current flowing through the driving element DT.

At the fifth period I5, a voltage of the second light emission control signal EM2(*n*) is a gate high voltage VGH, and a voltage of the first, second and third scan signals SC1(*n*), SC2(*n*), and SC3(*n*), and the first light emission control signal EM1(*n*) is a gate low voltage VGL. At the fifth period I5, the fifth and sixth switching elements T5 and T6 are turned on, and the first to fourth switching elements T1 to T4 are turned off. At the fifth period I5, a voltage of the second node N2 is Vdata−Vref+Vth+Voled, and a voltage of the third node N3 is Voled. Here, Voled is an anode voltage when the light emitting element EL is emitted. Therefore, at the fifth period I5, a gate-to-source voltage Vgs of the driving element DT is Vdata−Vref+Vth. At the fifth period I5, a voltage of the first capacitor C1 is Vdata-Vref, and a voltage of the second capacitor C2 is the threshold voltage Vth of the driving element DT.

Referring to FIG. 6B, the light emission control period T2 includes a sixth period I6 and a seventh period I7.

The sixth period I6 performs the same operation as the fifth period I5, and is a period at which the light emitting element EL emits light, and the seventh period I7 is a period at which the light emitting element EL does not emit light.

At the seventh period I7, a voltage of the first, second, and third scan signals SC1(*n*), SC2(*n*) and SC3(*n*) and the first and second light emission control signals EM1(*n*) and EM2(*n*) is a gate low voltage VGL. At the seventh period I7, the first, second, third, fourth, and sixth switching elements T1, T2, T3, T4 and T6 remaining after excluding the fifth switching element T5 are turned off.

Since the sixth switching element T6 is in a turned-off state, at the seventh period I7, the light emitting element EL does not emit light, and at the light emission control period T2, the light emitting element EL can perform turn-on/turn-off operation at a frequency obtained by multiplying i to an input frame frequency. For example, when the input frame frequency is 60 hz or 120 Hz, the light emitting element EL can repeat a turn-on/turn-off operation.

Referring to FIG. 6C, the anode reset period T3 includes an eighth period I8, a ninth period I9, and a tenth period I10.

At the eighth period I8, the same operation as the fourth period I4 of the refresh period I1 is performed, and the anode electrode 171 of the light emitting element EL which is the fifth node N5 is reset and the third node N3 is reset at the same time, and the ninth period I9 is an period at which the fifth node N5 is reset. The eighth period I8 is repeated twice at the anode reset period T3, and the ninth period I9 is performed between the eighth periods I8, however, according to embodiments, the ninth period I9 can be omitted.

At the tenth period I10, the same operation as the fifth period I5 of the refresh period T1 is performed, and the light emitting element EL emits light.

At the anode reset period T3, according to an operation of the eighth period I8 to the tenth period I10, the pixel circuit can perform an anode reset operation at a frequency obtained by multiplying i to an input frame frequency. For example, when the input frame frequency is 60 Hz or 120 Hz, the pixel circuit can perform the anode reset operation at 480 Hz, or at 240 Hz.

Figure 7A:
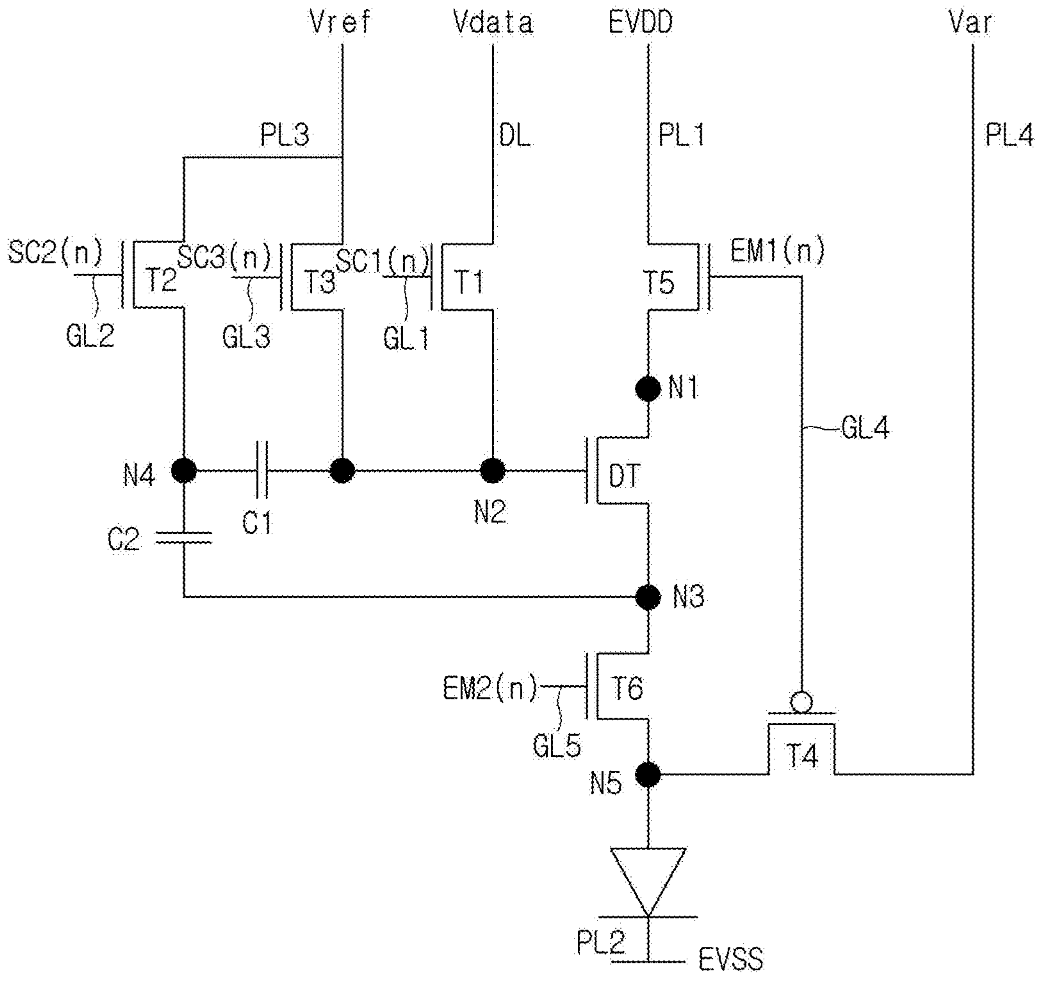
FIGS. 7A and 7B are respectively a diagram of a pixel circuit in a display device, and an operation timing chart of a pixel circuit in a display device according to another embodiment of the present disclosure.
Figure 7B:
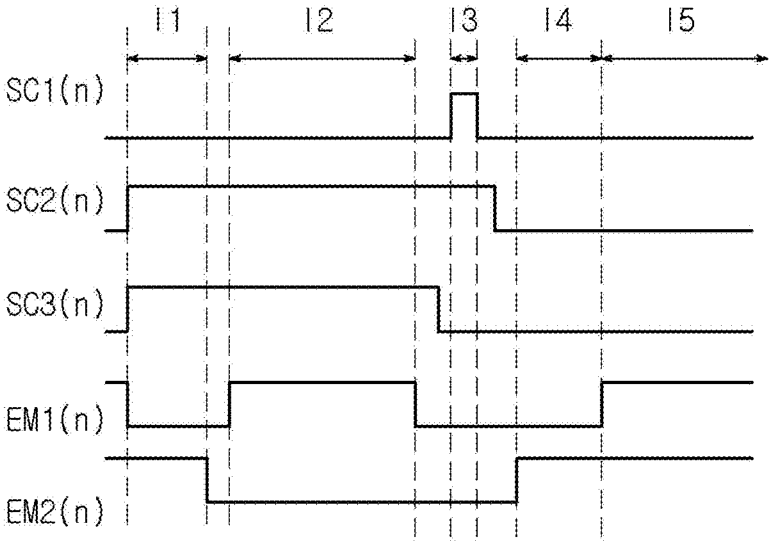

FIGS. 7A and 7B are respectively a diagram of a pixel circuit in a display device, and an operation timing chart of a pixel circuit in a display device according to another embodiment of the present disclosure.

Referring to FIGS. 7A and 7B, in the pixel circuit in FIG. 7A, the fourth switching element T4 and the fifth switching element T5 to which the first light emission control signal EM1(*n*) is applied can be configured to be opposite to each other in comparison with the pixel circuit and the operation timing of FIGS. 5 to 6C, and a voltage level of the first light emission control signal EM1(*n*) can be the opposite.

In other words, the fourth switching element T4 can be implemented as a p-channel LTPS TFT, and the fifth switching element T5 can be implemented as an n-channel oxide TFT. In addition, the first light emission control signal EM1(*n*) can be a gate low voltage VGL at the first period I1, the third period I3, and the fourth period I4 of the refresh period T1, and can be a gate high voltage VGH at the second period I2 and the fifth period I5. Similar to the above, an operation at the light emission control period T2 and the anode reset period T3 can have the opposite voltage level to a voltage level of FIGS. 6B and 6C. The remaining components apart from the above are the same, thus the detailed description thereof will be omitted.

Figure 8:
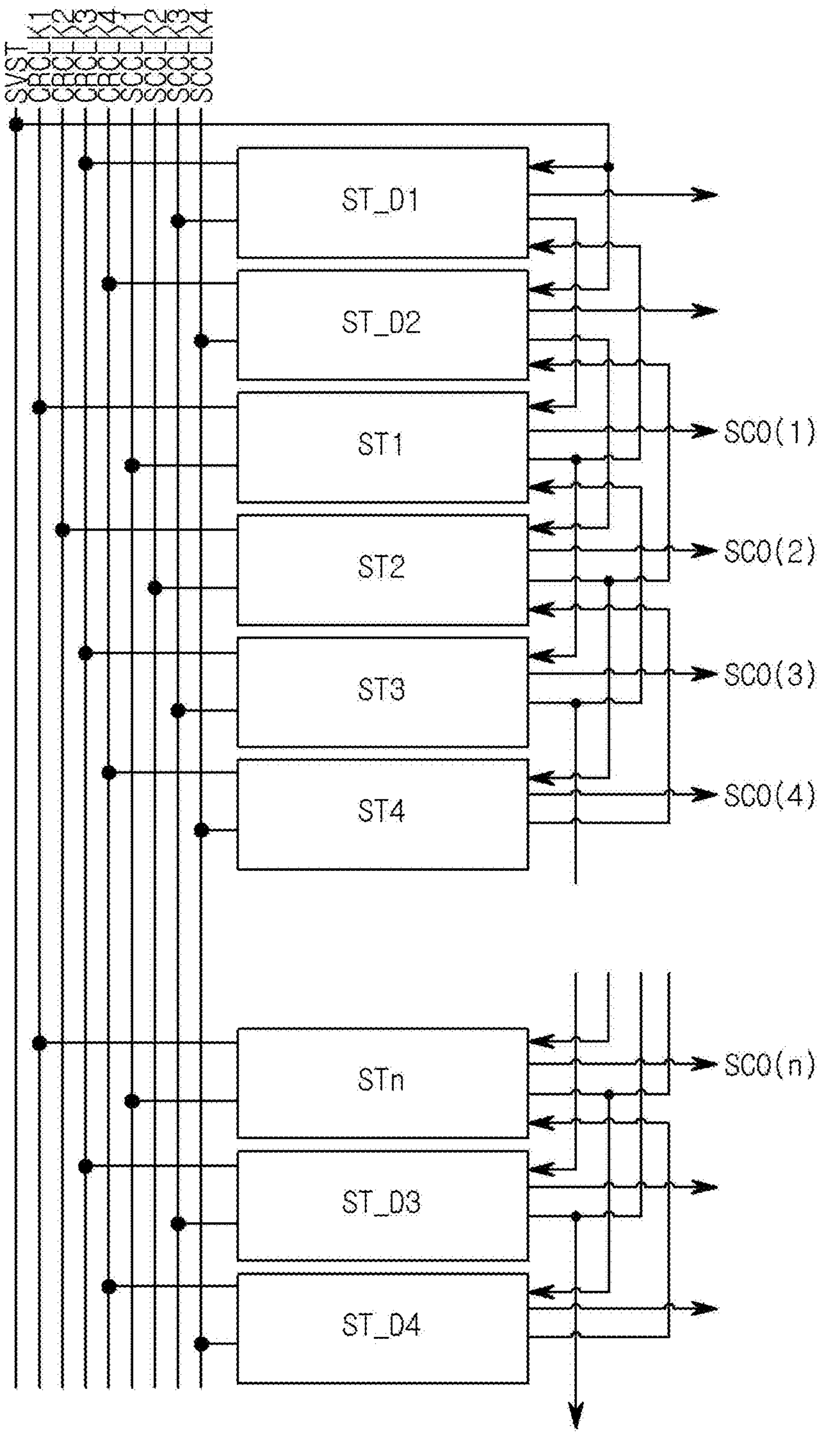
FIG. 8 is a diagram illustrating a connection structure of a signal transferring unit in a shift register.

FIG. 8 is a diagram illustrating a connection structure of a signal transferring unit in the shift register. The shift register illustrated in FIG. 8 is an example of a single feeding circuit generating first to n-th output signals, but the disclosed technology is not limited thereto. In case of a double-feeding circuit, a single feeding-circuit illustrated in FIG. 8 is disposed in a left-right symmetrical structure and is connected to both ends of the gate lines.

Referring to FIG. 8, the shift register includes a plurality of signal transferring units ST1 to STn electrically connected through clock lines and carry signal lines. An n-th (n is a natural number) signal transferring unit generates an n-th output signal. An n-th output signal can be applied to a gate line connected to the pixels of an n-th pixel line on the display panel 100. For example, a first output signal SCO(1) output from the first signal transferring unit ST1 can be a gate signal applied to a first gate line connected to sub-pixels of a first pixel line L1. An n-th output signal SCO(n) output from the n-th signal transferring unit STn can be a gate signal applied to a gate line connected to sub-pixels of the n-th pixel line.

The shift register can further include dummy signal transferring units ST_D1 and ST_D2. A carry signal output from the dummy signal transferring units ST_D1 and ST_D2 is input as a start signal of the first and second signal transferring units ST1 and ST2. A signal output from the dummy signal transferring units ST_D1 and ST_D2 is not applied to the gate line. Lower dummy signal transferring units ST_D3 and ST_D4 can be disposed below the n-th signal transferring unit STn. The lower dummy signal transferring units ST_D3 and ST_D4 can transmit a reset pulse to an n−1-th signal transferring unit STn−1, and the n-th signal transferring unit STn.

Signal transferring units ST_D1, ST_D2, ST_D3, ST_D4 and ST1 to STn include a clock node through which clocks CRCLK1 to 4 and SCCLK1 to 4 are input through clock lines, a SET node through which a start pulse SVST or a previous carry signal output from a previous stage is input, and an output node through which a carry signal and output signals SCO(1) to SCO(n) are output. The signal transferring units ST_D1, ST_D2, ST_D3, ST_D4 and ST1 to STn can further include an RST node through which a reset pulse or a carry signal output from the next stage is input.

The start pulse SVST is input to the SET node of the first dummy signal transferring unit ST_D1. When the start pulse SVST is applied to the first dummy signal transferring unit ST_DT1, the first dummy signal transferring unit ST_DT1 starts operating and sequential output from the signal transferring units is generated.

Figure 9:
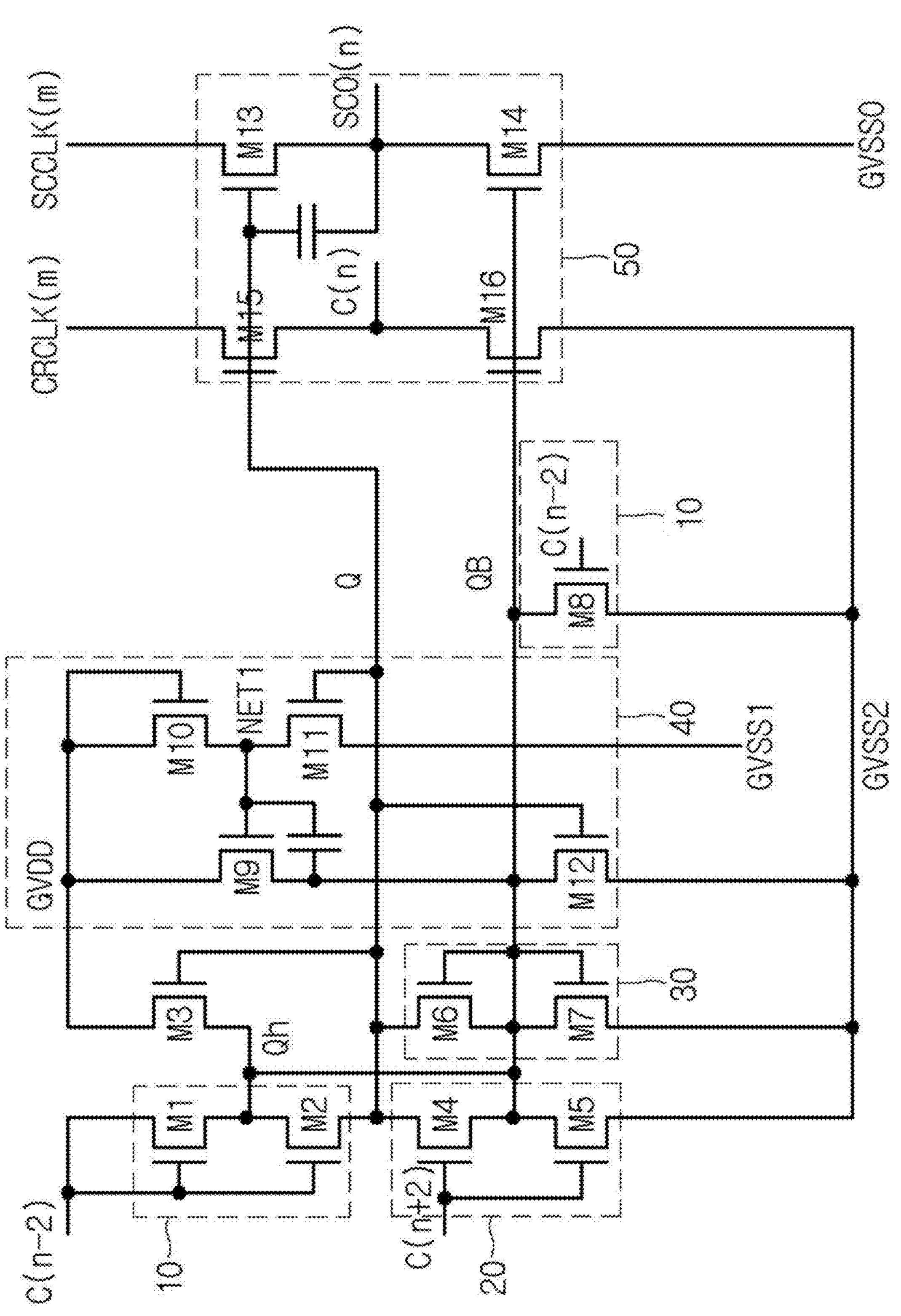
FIG. 9 is a circuit diagram illustrating an example of a circuit of an n-th signal transferring unit in the shift register illustrated in FIG. 8.

FIG. 9 is a circuit diagram illustrating an example of a circuit of the n-th signal transferring unit in the shift register illustrated in FIG. 8.

Referring to FIG. 9, the n-th signal transferring unit includes an input unit 10, a reset unit 20, a stabilization unit 30, and inverter 40, and an output buffer 50.

The n-th signal transferring unit includes power nodes to which a constant voltage is applied, for example, a GVDD node to which a gate high voltage VGH is applied, and VSS nodes GVSS0, GVSS1 and GVSS2 to which a gate low voltage VGL is applied. A gate low voltage VGL in the same voltage level, or a gate low voltage VGL in each different voltage level can be applied to the VSS nodes GVSS0, GVSS1 and GVSS2. For example, even if a threshold voltage of the transistors M13 to M16 of the output buffer 50 is shifted to a negative polarity voltage smaller than OV, a voltage of a GVSS0 node can be set to be higher than a voltage of GVSS2 so that the transistors M13 to M16 can be turned on.

The input unit 10 includes a first transistor M1, a second transistor M2, a third transistor M3, and an eighth transistor M8.

The first transistor M1 is turned on when a voltage of a first input signal [C(n−2)] is a gate high voltage VGH, and transmits the voltage of the first input signal [C(n−2)] to a first buffer node Qh. The first input signal can be a pulse of a carry signal output from a previous signal transferring unit, for example, an n−2-th signal transferring unit, but is not limited thereto. The first transistor M1 includes a first electrode and a gate electrode to which the first input signal [C(n−2)] is applied, and a second electrode connected to the first buffer node Qh.

The second transistor M2 is turned on when the voltage of the first input signal [C(n−2)] is a gate high voltage VGH, and connects the first buffer node Qh to a first control node Q. The second transistor M2 includes a gate electrode to which the first input signal [C(n−2)] is applied, a first electrode connected to the first buffer node Qh, and a second electrode connected to the first control node Q.

The first and second transistors M1 and M2 are connected in a two-transistor series (TTS) structure in which the transistors are connected in series. The transistors connected in the TTS structure have little leakage current. Meanwhile, transistors M4 to M7 of the stabilization unit 30 and the reset unit 20 are connected in the TTS structure as well.

The third transistor M3 is turned on when the first control node Q is charged, and prevents or reduce a leakage current of the first control node Q by connecting a GVDD node to the first buffer node Qh. The third transistor M3 includes a gate electrode connected to the first control node Q, a first electrode connected to the GVDD node, and a second electrode connected to the first buffer node Qh.

The eighth transistor M8 is turned on when the voltage of the first input signal [C(n−2)] is a gate high voltage VGH, and connects a second control node QB to a first VSS node GVSS2. A tenth transistor M10 includes a gate electrode to which the first input signal [C(n−2)] is applied, a first electrode connected to the second control node QB, and a second electrode connected to a GVSS1 node.

The reset unit 20 includes the fourth and fifth transistors M4 and M5.

The fourth transistor M4 is turned on when a voltage of a second input signal [C(n+2)] is a gate high voltage VGH, and connects the first control node Q to the first buffer node Qh. The second input signal [C(n+2)] can be a reset pulse, or a pulse of a carry signal output from the next signal transferring unit, for example, an n+2-th signal transferring unit, but is not limited thereto. The fourth transistor M4 includes a gate electrode to which the second input signal [C(n+2)] is applied, a first electrode connected to the first control node Q, and a second electrode connected to the first buffer node Qh.

The fifth transistor M5 is turned on when a voltage of the second input signal [C(n+2)] is a gate high voltage VGH, and connects the first buffer node Qh to a GVSS2 node. The fifth transistor M5 includes a gate electrode to which the second input signal [C(n+2)] is applied, a first electrode connected to the first buffer node Qh, and a second electrode connected to the GVSS2 node.

The stabilization unit 30 includes sixth and seventh transistors M6 and M7.

The sixth transistor M6 is turned on when a voltage of the second control node QB is a gate high voltage VGH, and connects the first control node Q to the first buffer node Qh. The sixth transistor M6 includes a gate electrode connected to the second control node QB, a first electrode connected to the first control node Q, and a second electrode connected to the first buffer node Qh.

The seventh transistor M7 is turned on when the voltage of the second control node QB is a gate high voltage VGH, and connects the first buffer node Qh to the GVSS2 node. The seventh transistor M7 includes a gate electrode connected to the second control node QB, a first electrode connected to the first buffer node Qh, and a second electrode connected to the GVSS2 node.

The inverter 40 includes ninth to twelfth transistors M9 to M12.

When the ninth transistor M9 is turned on, charging of the second control node QB is possible. The ninth transistor M9 includes a gate electrode connected to a second buffer node NET1, a first electrode connected to the GVDD node, and a second electrode connected to the second control node QB. A capacitor is connected between the gate electrode and the second electrode of the ninth transistor M9. As soon as the ninth transistor M9 is turned on, a voltage of the second buffer node NET1 is boosted to a voltage of the GVDD node through the capacitor coupling.

The tenth transistor M10 includes a first electrode and a gate electrode connected to the GVDD node, and a second electrode connected to the second buffer node NET1. The eleventh transistor M11 includes a gate electrode connected to the first control node Q, a first electrode connected to the second buffer node NET1, and a second electrode connected to the GVSS1 node. The twelfth transistor M12 includes a gate electrode connected to the first control node Q, a first electrode connected to the second control node QB, and a second electrode connected to the GVSS2 node.

The output buffer 50 includes thirteenth to sixteenth transistors M13 to T16.

The thirteenth transistor M13 is a pull-up transistor configured to charge the first output node by being turned on when a voltage of the first control node Q is boosted to a higher voltage than a gate on voltage and transmitting a gate on voltage of a clock [SCCLK (m (m is a natural number))] to the first output node. When the first output node is charged, a voltage of a gate signal [SCO(n)] increases to a gate high voltage VGH. The thirteenth transistor M13 includes a gate electrode connected to the first control node Q, a first electrode connected to a first clock node to which a clock [SCCLK (m)] is applied, and a second electrode connected to the first output node. A capacitor is connected between the gate electrode and the first electrode of the thirteenth transistor M13. The capacitor boosts a voltage of the first control node Q to a gate on voltage of the clock [SCCLK (m)] when the thirteenth transistor M13 is turned on.

A fourteenth transistor M14 is a pull-down transistor configured to connect the first output node to the GVSS0 node to which a gate low voltage VGL is applied by being turned on when a voltage of the second control node Q is a gate on voltage. When the first output node is discharged, a voltage of the gate signal output through the first output node decreases to a gate low voltage VGL. The fourteenth transistor M14 includes a gate electrode connected to the second control node QB, a first electrode connected to the first output node, and a second electrode connected to the GVSS0 node.

A fifteenth transistor M15 is a pull-up transistor configured to transmits a gate on voltage of a carry signal clock [CRCLK(m)] to the second output node by being turned on when the voltage of the first control node Q is boosted to a voltage higher than a gate on voltage. The fifteenth transistor M15 includes a gate electrode connected to the first control node Q, a first electrode connected to the second clock node to which the carry signal clock [CRCLK(m)] is input, and a second electrode connected to the second output node.

The sixteenth transistor M16 is a pull-down transistor configured to connect the second output node to the GVSS2 node and discharge the second output node by being turned on when the voltage of the second control node QB is a gate high voltage. The sixteenth transistor M16 includes a gate electrode connected to the second control node QB, a first electrode connected to the second output node, and a second electrode connected to the GVSS2 node.

The shift register illustrated in FIGS. 8 and 9 can be used as a gate driving circuit configured to output the first scan signal SC1(*n*), but is not limited thereto.

Figure 10:
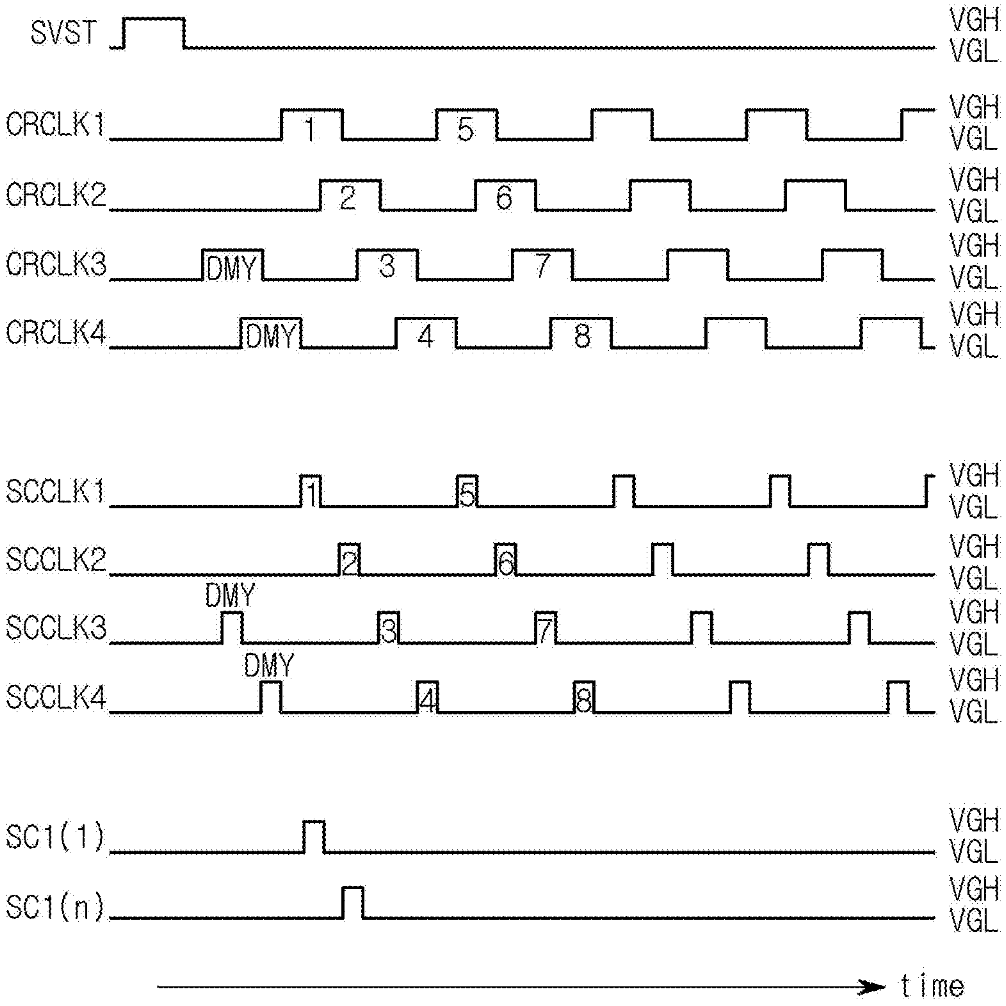
FIG. 10 is an operation timing diagram chart illustrating an example of an input/output signal of the shift register illustrated in FIGS. 8 and 9.

FIG. 10 is an operation timing diagram chart illustrating an example of an input/output signal of the shift register illustrated in FIGS. 8 and 9.

Referring to FIG. 10, 'DMY' represents a pulse of the carry signal output from the dummy signal transferring unit and a clock input to the dummy signal transferring unit. A numeral written side-by-side with the pulse of the clocks SCCLK1 to 4 and CRCLK1 to 4 represents a sequence number of the pulse being shifted. Clock pulses '1' and '2' are synchronized with a pulse of the first scan signal SC1(*n*) sequentially applied to first gate lines of the first pixel line and the second pixel line. SC1(1) is the first gate signal synchronized with the clock pulse 1, and is applied to the first gate line of the first pixel line. SC1(*n*) is the first gate signal synchronized with the clock pulse n and is applied to the first gate line of the n-th pixel line. In FIG. 10, it is likely that n is 2.

Figure 11:
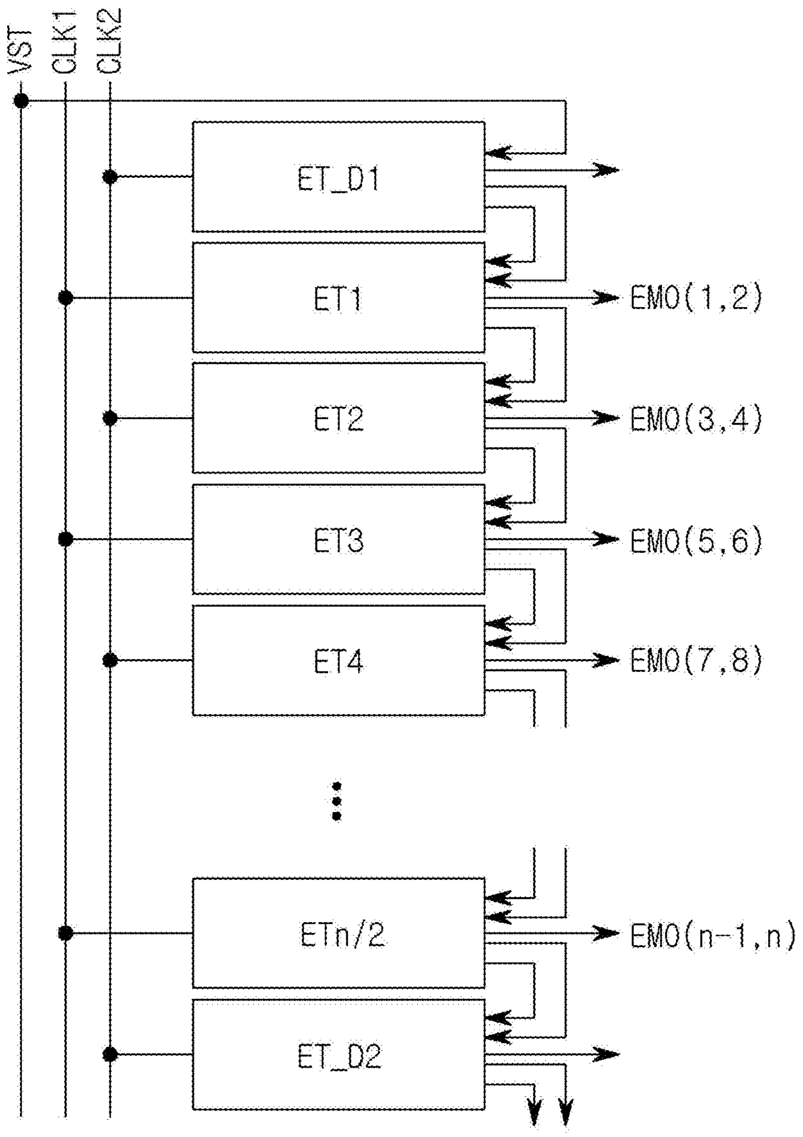
FIG. 11 is a diagram illustrating a connection structure of signal transferring units in an edge trigger.

FIG. 11 is a diagram illustrating a connection structure of the signal transferring units in the edge trigger.

The edge trigger illustrated in FIG. 11 illustrates output signals EMO1_2 to EMOn−1_n output from the first to n/2-th signal transferring units, but is not limited thereto. In case of a double feeding circuit, a single feeding circuit illustrated in FIG. 11 is disposed in a left-right symmetrical structure and connected to both ends of the gate lines.

Referring to FIG. 11, the edge trigger includes a plurality of signal transferring units ET1 to ETn/2 electrically connected thereto through clock lines and carry signal lines. The n/2 signal transferring unit generates an output signal shared by two pixel lines. For example, an output signal EMO1_2 output from a first signal transferring unit ET1 can be a gate signal applied to a gate line shared by the first pixel line and second pixel line. The output signal EMOn−1_n output from the n/2 signal transferring unit ETn/2 can be a gate signal applied to a gate line shared by an n−1-th pixel line and an n-th pixel line.

The shift register can further include a dummy signal transferring unit ET_D1. The dummy signal transferring unit ET_D1 transmits a voltage and a carry signal of the second control node to the first signal transferring unit ET1. A signal output from the dummy signal transferring unit ET_b is not applied to the gate line. A lower signal transferring ET_D2 can be disposed below the n/2 signal transferring unit ETn/2.

The signal transferring units ET_D1, ET_D2, and ET1~ETn/2 include a clock node to which clocks CLK1 and CLK2 are input through the clock lines, a SET node to which a start pulse VST or a previous carry signal output from a previous stage is input, and an output node through which output signals EMO1 to EMOn−1_n and a carry signal are output. The signal transferring units ET_D1, ET_D2 and ET1~ETn/2 can further include an RST node to which a reset pulse or a carry signal output from the next stage is input.

The start pulse VST is input to the SET node of the dummy signal transferring unit ET_D1. When the start pulse VST is input to the first dummy signal transferring unit ET_DT1, the first dummy signal transferring unit ET_DT1 starts operating and sequential output from the signal transferring units is generated.

Figure 12:
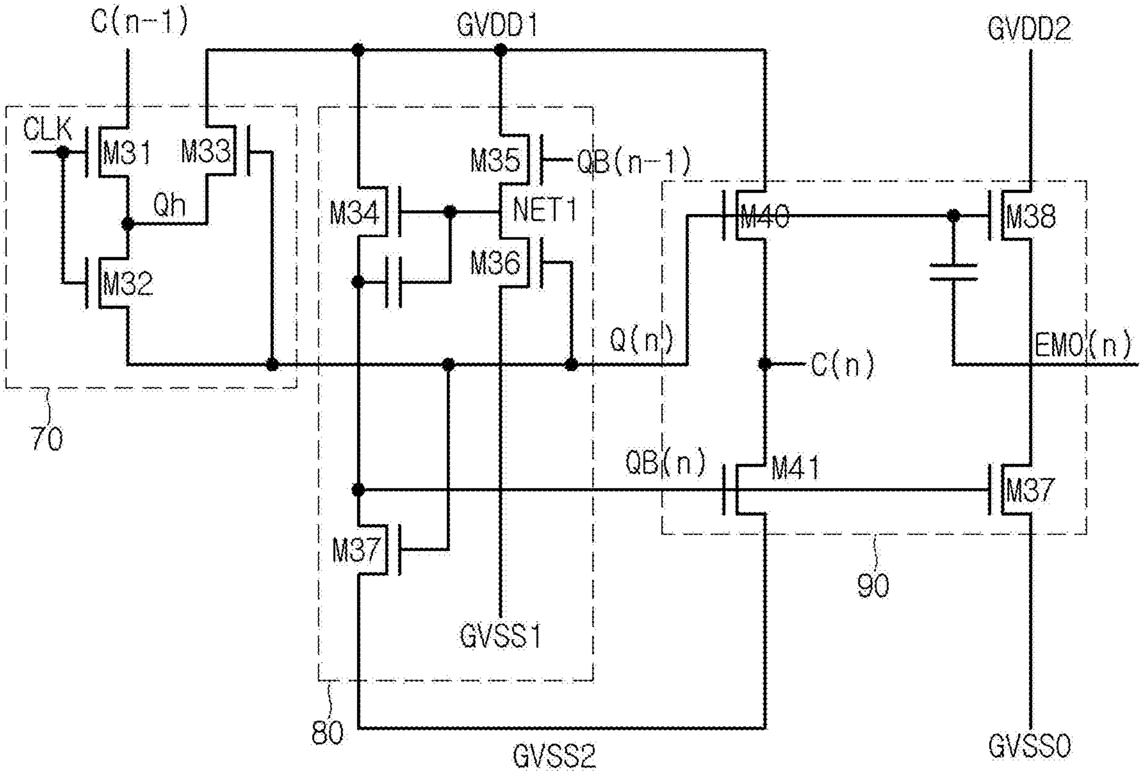
FIG. 12 is a circuit diagram illustrating an example of an n-th signal transferring unit in the shift register illustrated in FIG. 11, where n is a natural number.

FIG. 12 is a circuit diagram illustrating an example of an n-th (n is a natural number) signal transferring unit in the shift register illustrated in FIG. 11.

Referring to FIG. 12, the n-th signal transferring unit includes an input unit 70, an inverter 80, and an output buffer 90.

The n-th signal transferring unit includes power nodes to which a constant voltage is applied, for example, VDD nodes GVDD1 and GVDD2 to which a gate high voltage VGH is applied, and VSS nodes GVSS0, GVSS1 and GVSS2 to which a gate low voltage VGL is applied. A gate low voltage VGL in the same voltage level, or a gate low voltage VGL in each different voltage level can be applied to the VSS nodes GVSS0, GVSS1 and GVSS2. For example, even if a threshold voltage of the transistors M38 to M41 of the buffer 90 is shifted to a negative polarity voltage smaller than OV, a voltage of GVSS0 can be set to be higher than a voltage of GVSS2 so that the transistors M38 to M41 can be turned on. The VDD nodes GVDD1 and GVDD2 can be divided so as to prevent or reduce a phenomenon by which a voltage of the output signal OUT is dropped or risen.

The input unit 70 includes a first transistor M31, a second transistor M32, and a third transistor M33.

The first transistor M31 includes a first electrode to which a first input signal [C(n−1)] is applied, a gate electrode to which the clock CLK is applied, and a second electrode connected to the first buffer node Qh. The first input signal [C(n−1)] can be a start pulse, or a pulse of a carry signal output from a previous signal transferring unit. The second transistor M32 includes a gate electrode to which a clock CLK is applied, a first electrode connected to the first buffer node Qh, and a second electrode connected to the first control node Q. The first and second transistors M31 and M32 are connected in series and prevent or reduce a leakage current of the first control node Q. At this instance, in case of an odd-numbered signal transferring unit, the clock CLK can be a first clock CLK1, and in case of an even-numbered signal transferring unit, the clock CLK can be a second clock CLK2.

The third transistor M33 includes a gate electrode connected to the first control node Q, a first electrode connected to the GVDD1 node, and a second electrode connected to the first buffer node Qh.

The inverter 80 includes a fourth transistor M34, a fifth transistor M35, a sixth transistor M36, and a seventh transistor M37.

The fourth transistor M34 includes a gate electrode connected to the second buffer node NET1, a first electrode connected to the GVDD1 node, and a second electrode connected to the second control node QB. A capacitor is connected between the gate electrode and the second electrode of the fourth transistor M34. The fifth transistor M35 includes a gate electrode to which a second control node voltage [QB(n−1)] of the n−1-th signal transferring unit is applied, a first electrode connected to the GVDD1 node, and a second electrode connected to the second buffer node NET1. The sixth transistor M36 includes a gate electrode connected to the first control node Q, a first electrode connected to the second buffer node NET1, and a second electrode connected to the GVSS1 node. The seventh transistor M37 includes a gate electrode connected to the first control node Q, a first electrode connected to the second control node QB, and a second electrode connected to the GVSS2 node.

The output buffer 90 includes an eighth transistor M38, a tenth transistor M40, and an eleventh transistor M41.

The eighth transistor M38 includes a gate electrode connected to the first control node Q, a first electrode connected to a GVDD2 node, and a second electrode connected to the first output node. A capacitor is connected between the gate electrode and the first output node of the eight transistor M38. The eighth transistor M38 is a pull-up transistor configured to rise a gate signal output through the first output node. The ninth transistor M49 includes a gate electrode connected to the second control node QB, a first electrode connected to the first output node, and a second electrode connected to a GVSS0 node. The ninth transistor M39 is a pull-down transistor configured to discharge the first output node up to a voltage of the GVSS0 node.

The tenth transistor M40 includes a gate electrode connected to the first control node Q, a first electrode connected to the GVDD1 node, and a second electrode connected to the second output node. The tenth transistor M40 is a pull-up transistor configured to rise a carry signal output through the second output node. The eleventh transistor M41 includes a gate electrode connected to the second control node QB, a first electrode connected to the second output node, and a second electrode connected to the GVSS2 node. The eleventh transistor M41 is a pull-down transistor configured to discharge the second output node up to a voltage of the GVSS0 node.

The edge trigger illustrated in FIGS. 11 and 12 can be used as a gate driving circuit configured to output the second scan signal SC2(*n*), the third scan signal SC3(*n*), the first light emission control signal EM1(*n*), and the second light emission control signal EM2(*n*), but is not limited thereto.

Figure 13:
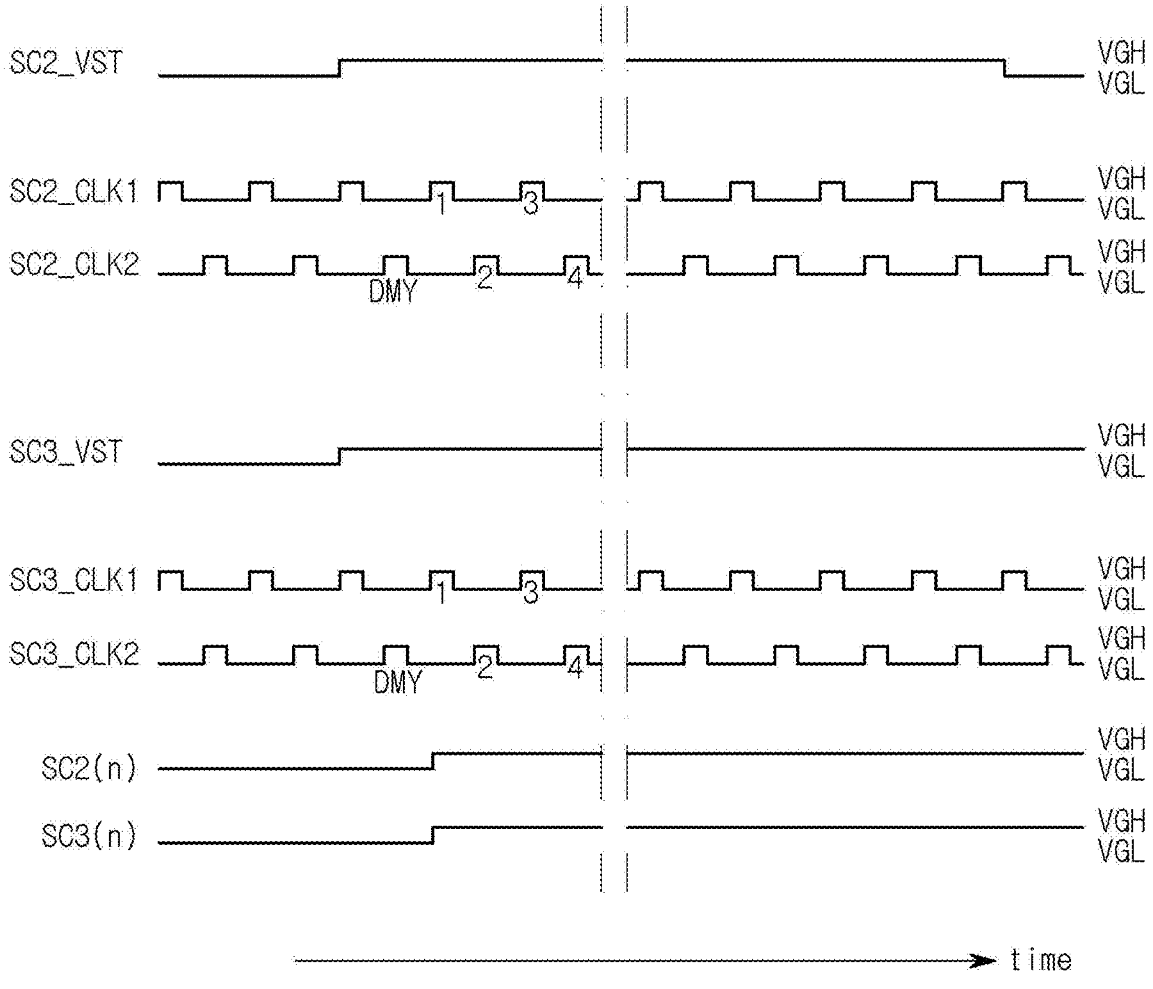
FIGS. 13 and 14 are operation timing charts illustrating an example of an input/output signal of the shift register illustrated in FIGS. 11 and 12.
Figure 14:
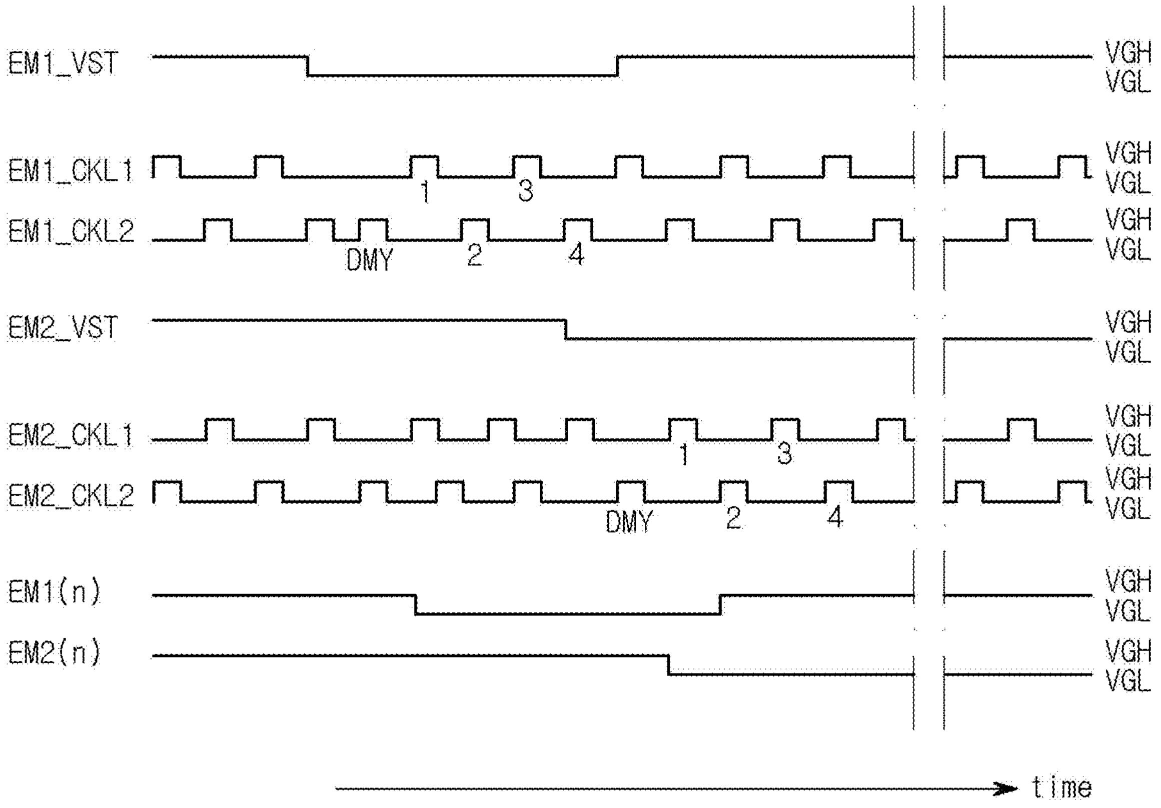

FIGS. 13 and 14 are operation timing charts illustrating an example of an input/output signal of the shift register illustrated in FIGS. 11 and 12.

Referring to FIGS. 13 and 14, 'DMY' represents a pulse of a clock input to the dummy signal transferring unit. SC2_VST, SC2_CLK1 and SC2_CLK2 are a start pulse and clocks input to the edge trigger which outputs the second scan signal SC2(*n*). SC3_VST, SC3_CLK1 and SC3_CLK2 are a start pulse and clocks input to the edge trigger which outputs the third scan signal SC3(*n*). EM1_VST, EM1_CLK1 and EM1_CLK2 are a start pulse and clocks input to the edge trigger which outputs the first light emission control signal EM1(*n*). EM2_VST, EM2 CLK1 and EM2_CLK2 are a start pulse and clocks input to the edge trigger which outputs the second light emission control signal EM2(*n*).

A numeral written side-by-side with the pulse of the clocks represents a sequence number of the pulse being shifted. Clock pulses '1' and '2' are synchronized with a pulse of the scan signals SC2(*n*) and SC3(*n*), or the light emission control signal EM1(*n*) and EM2(*n*) sequentially applied to gate lines of the first pixel line and the second pixel line. Here, SC2(*n*), SC3(*n*), EM1(*n*) and EM2(*n*) are signals synchronized with a pulse of the clock pulse '1' or '2' and applied to the gate line of the n-th pixel line.

A display device according to aspects of the present disclosure can be described as below.

One embodiment of the present disclosure provides a display device, including: a display panel on which a plurality of data lines, a plurality of gate lines, a plurality of power lines, and a plurality of pixels are disposed on a substrate; a data driver configured to output a data voltage of pixel data to one of the data lines; and a gate driver configured to supply a gate signal to one of the gate lines sequentially, where each pixel can include: a light emitting element including a first electrode, a second electrode facing the first electrode, and a light emitting layer disposed between the first electrode and the second electrode; a driving element configured to control the light emitting element; and a plurality of switching elements configured to control the driving element. Further, the driving element can include an oxide semiconductor layer.

In a display device according to an embodiment of the present disclosure, each pixel can include a first node connected to the first electrode of the driving element, a second node connected to a gate electrode, and a third node connected to the second electrode; a first capacitor connected between the second node and a fourth node; a second capacitor connected between the third node and the fourth node; a fifth node connected to the first electrode of the light emitting element; a first switching element configured to transmit a data voltage to the second node in response to a first gate signal; a second switching element configured to apply a reference voltage to the second node in response to a second gate signal; and a third switching element configured to apply the reference voltage to the fourth node in response to a third gate signal.

In a display device according to an embodiment of the present disclosure, a driving period of the each pixel can include a first period, a second period, a third period, a fourth period, and a fifth period, a voltage of the first gate signal can be a gate-on voltage at the third period, and a gate-off voltage at the first period, the second period, the fourth period, and the fifth period, a voltage of the second gate signal can be the gate-on voltage at the first period, the second period, and the third period, and the gate-off voltage at the fourth period and the fifth period, a voltage of the third gate signal can be the gate-on voltage at the first period and the second period, and the gate-off voltage at the third period, the fourth period and the fifth period. Further, each of the first switching element, the second switching element, and the third switching element can be turned on in response to the gate-on voltage, and can be turned off in response to the gate-off voltage.

In a display device according to an embodiment of the present disclosure, each pixel can further include a fourth switching element configured to apply an anode reset voltage to the fifth node in response to a fourth gate signal; a fifth switching element configured to apply a high potential driving voltage to the first node in response to the fourth gate signal; and a sixth switching element configured to electrically connect the third node to the fifth node in response to a fifth gate signal.

In a display device according to an embodiment of the present disclosure, a driving period of each pixel can include a first period, a second period, a third period, a fourth period, and a fifth period. Further, a voltage of the fourth gate signal can be applied in a different level at the second period and the fifth period from the first period, the third period, and the fourth period, a voltage of the fifth gate signal can be a gate-on voltage at the first period, the fourth period, and the fifth period, and a gate-off voltage at the second period and the third period, and the fourth switching element and the fifth switching element can be turned on or turned off in response to the fourth gate signal.

In a display device according to an embodiment of the present disclosure, the driving period of the each pixel can include a refresh period, an anode reset period, and a light emission control period, a threshold voltage of the driving element can be sensed and compensated during the refresh period. Further, the first electrode of the light emitting element is reset to a reset voltage during the anode reset period, and the light emission control period can be disposed between the refresh period and the anode reset period.

In a display device according to an embodiment of the present disclosure, when the refresh period is driven at a first frequency, the anode reset period can be driven at a second frequency faster than the first frequency.

In a display device according to an embodiment of the present disclosure, the second frequency can be four times or eight times the first frequency.

In a display device according to an embodiment of the present disclosure, the plurality of switching elements can include a first transistor configured to include a poly semiconductor layer; and a second transistor configured to include an oxide semiconductor layer, and the poly semiconductor layer can be disposed at a lower layer than the oxide semiconductor layer.

In a display device according to an embodiment of the present disclosure, the plurality of switching elements can include a third transistor connected to a first electrode of the driving element; and a fourth transistor connected to a second electrode of the driving element, and the third transistor and the fourth transistor can have different semiconductor layers from each other.

In a display device according to an embodiment of the present disclosure, the third transistor can be configured to include a poly semiconductor layer, and the fourth transistor can be configured to include an oxide semiconductor layer.

In a display device according to an embodiment of the present disclosure, the oxide semiconductor layer can be disposed at an upper layer than the poly semiconductor layer.

In a display device according to an embodiment of the present disclosure, the third transistor can have a first electrode connected to a driving power line to which a high potential driving voltage is applied and a second electrode connected to the driving element, and the fourth transistor can have a first electrode connected to the driving element and a second electrode connected to the light emitting element.

In a display device according to an embodiment of the present disclosure, the third transistor can be turned on by a first light emission control signal, and the fourth transistor can be turned on by a second light emission control signal.

In a display device according to an embodiment of the present disclosure, the gate driver can include first to third scan drivers and first and second light emission control drivers.

In a display device according to an embodiment of the present disclosure, the first and the second light emission control drivers can be disposed between the first to the third scan drivers.

In a display device according to an embodiment of the present disclosure, the first scan driver can be configured with a (1-1)th scan driver configured to supply a first scan signal to an odd-numbered pixel row and a (1-2)th scan driver configured to supply the first scan signal to an even-numbered pixel row.

In a display device according to an embodiment of the present disclosure, the second light emission control driver can be disposed at an outermost side.

Features of various embodiments of the present disclosure can be partially or overall coupled to or combined with each other, and can be variously inter-operated with each other and driven technically as those skilled in the art can sufficiently understand. Embodiments of the present disclosure can be carried out independently from each other, or can be carried out together in co-dependent relationship.

Contents of the present disclosure provided above as the object aimed to be resolved, the means of resolving the object, and the effect thereof do not specify necessary characteristics of the appended claims, therefore, a scope of a right of the claims is not limited by what is provided as the contents of the disclosure.

The present disclosure has been described in more detail with reference to the example embodiments, but the present disclosure is not limited to the example embodiments. It will be apparent to those skilled in the art that various modifications can be made without departing from the technical sprit of the disclosure. Accordingly, the example embodiments disclosed in the present disclosure are used not to limit but to describe the technical idea of the present disclosure, and the technical idea of the present disclosure is not limited to the example embodiments. Therefore, the example embodiments described above are considered in all respects to be illustrative and not restrictive. The protection scope of the present disclosure must be interpreted by the appended claims and it should be interpreted that all technical idea within a scope equivalent thereto are included in the appended claims of the present disclosure.

What is claimed is:

1. A display device, comprising:

a display panel on which a plurality of data lines, a plurality of gate lines, a plurality of power lines, and a plurality of pixels are disposed on a substrate;

a data driver configured to output a data voltage of pixel data to one of the plurality of data lines; and a gate driver configured to supply a gate signal to one of the plurality of gate lines sequentially, wherein each of the plurality of pixels comprises:

a light emitting element including a first electrode, a second electrode facing the first electrode, and a light emitting layer disposed between the first electrode and the second electrode;

a driving element configured to control the light emitting element; and a plurality of switching elements configured to control the driving element, and wherein the driving element includes an oxide semiconductor layer, and wherein each of the plurality of pixels comprises:

a first node connected to a first electrode of the driving element, a second node connected to a gate electrode of the driving element, and a third node connected to a second electrode of the driving element;

a first capacitor connected between the second node and a fourth node;

a second capacitor connected between the third node and the fourth node; and a third switching element configured to apply a reference voltage to the fourth node in response to a third gate signal.

2. The display device of claim 1, wherein each of the plurality of pixels further comprises:

a fifth node connected to the first electrode of the light emitting element;

a first switching element configured to transmit a data voltage to the second node in response to a first gate signal; and a second switching element configured to apply the reference voltage to the second node in response to a second gate signal.

3. The display device of claim 2, wherein a driving period of each of the plurality of pixels includes a first period, a second period, a third period, a fourth period, and a fifth period, wherein a voltage of the first gate signal is a gate-on voltage at the third period, and a gate-off voltage at the first period, the second period, the fourth period, and the fifth period, wherein a voltage of the second gate signal is the gate-on voltage at the first period, the second period, and the third period, and the gate-off voltage at the fourth period and the fifth period, and wherein a voltage of the third gate signal is the gate-on voltage at the first period and the second period, and the gate-off voltage at the third period, the fourth period and the fifth period.

4. The display device of claim 2, wherein each of the plurality of pixels further comprises:

a fourth switching element configured to apply an anode reset voltage to the fifth node in response to a fourth gate signal;

a fifth switching element configured to apply a high potential driving voltage to the first node in response to the fourth gate signal; and a sixth switching element configured to electrically connect the third node to the fifth node in response to a fifth gate signal.

5. The display device of claim 4, wherein a driving period of each of the plurality of pixels includes a first period, a second period, a third period, a fourth period, and a fifth period, wherein a voltage of the fourth gate signal is applied at a different level at the second period and the fifth period from the first period, the third period, and the fourth period, wherein a voltage of the fifth gate signal is a gate-on voltage at the first period, the fourth period, and the fifth period, and a gate-off voltage at the second period and the third period, and wherein the fourth switching element and the fifth switching element are turned on or turned off in response to the fourth gate signal.

6. The display device of claim 1, wherein a driving period of each of the plurality of pixels includes a refresh period, an anode reset period, and a light emission control period, wherein a threshold voltage of the driving element is sensed and compensated during the refresh period, wherein the first electrode of the light emitting element is reset to an anode reset voltage during the anode reset period, and wherein the light emission control period is disposed between the refresh period and the anode reset period.

7. The display device of claim 6, wherein when the refresh period is driven at a first frequency, the anode reset period is driven at a second frequency faster than the first frequency.

8. The display device of claim 7, wherein the second frequency is four times or eight times the first frequency.

9. The display device of claim 1, wherein the plurality of switching elements includes:

a first transistor configured to include a poly semiconductor layer; and a second transistor configured to include an oxide semiconductor layer, and wherein the poly semiconductor layer is disposed as a lower layer than the oxide semiconductor layer.

10. The display device of claim 1, wherein the plurality of switching elements includes:

a third transistor connected to a first electrode of the driving element; and a fourth transistor connected to a second electrode of the driving element, and wherein the third transistor and the fourth transistor have different semiconductor layers from each other.

11. The display device of claim 10, wherein the third transistor is configured to include a poly semiconductor layer, and wherein the fourth transistor is configured to include an oxide semiconductor layer.

12. The display device of claim 11, wherein the oxide semiconductor layer is disposed as an upper layer than the poly semiconductor layer.

13. The display device of claim 10, wherein the third transistor has a first electrode connected to a driving power line to which a high potential driving voltage is applied and a second electrode connected to the driving element, and wherein the fourth transistor has a first electrode connected to the driving element and a second electrode connected to the light emitting element.

14. The display device of claim 10, wherein the third transistor is turned on by a first light emission control signal, and wherein the fourth transistor is turned on by a second light emission control signal.

15. The display device of claim 1, wherein the gate driver includes:

a first scan driver, a second scan driver, a third scan driver, a first light emission control driver, and a second light emission control driver.

16. The display device of claim 15, wherein the first and the second light emission control drivers are disposed between the first to the third scan drivers.

17. The display device of claim 15, wherein the first scan driver is configured with:

a (1-1)th scan driver configured to supply a first scan signal to an odd-numbered pixel row, and a (1-2)th scan driver configured to supply the first scan signal to an even-numbered pixel row.

18. The display device of claim 15, wherein the second light emission control driver is disposed at an outermost side of the display panel.

19. The display device of claim 3, wherein each of the first switching element, the second switching element, and the third switching element is turned on in response to the gate-on voltage, and is turned off in response to the gate-off voltage.

* * * * *